US010748529B1

(12) United States Patent
Milden

(10) Patent No.: US 10,748,529 B1
(45) Date of Patent: Aug. 18, 2020

(54) VOICE ACTIVATED DEVICE FOR USE WITH A VOICE-BASED DIGITAL ASSISTANT

(71) Applicant: Apple Inc., Cupertino, CA (US)

(72) Inventor: Kevin Milden, Oxnard, CA (US)

(73) Assignee: Apple Inc., Cupertino, CA (US)

( * ) Notice: Subject to any disclaimer, the term of this patent is extended or adjusted under 35 U.S.C. 154(b) by 641 days.

(21) Appl. No.: 14/205,104

(22) Filed: Mar. 11, 2014

Related U.S. Application Data

(60) Provisional application No. 61/799,722, filed on Mar. 15, 2013.

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01)

(58) Field of Classification Search
CPC ....................................................... G10L 15/22
USPC ......................................................... 704/275
See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |
| 3,979,557 A | 9/1976 | Schulman et al. | |
| 4,278,838 A | 7/1981 | Antonov | |
| 4,282,405 A | 8/1981 | Taguchi | |
| 4,310,721 A | 1/1982 | Manley et al. | |
| 4,348,553 A | 9/1982 | Baker et al. | |
| 4,653,021 A | 3/1987 | Takagi | |
| 4,688,195 A | 8/1987 | Thompson et al. | |
| 4,692,941 A | 9/1987 | Jacks et al. | |
| 4,718,094 A | 1/1988 | Bahl et al. | |

(Continued)

FOREIGN PATENT DOCUMENTS

| | | | |
|---|---|---|---|
| CH | 681573 A5 | 4/1993 | |
| DE | 3837590 A1 | 5/1990 | |

(Continued)

OTHER PUBLICATIONS

CastleOS—Whole House Voice Control Demonstration, Youtube Video, https://www.youtube.com/watch?v=9SRCoxrZ_W4 Jun. 2, 2012.*

(Continued)

*Primary Examiner* — Douglas Godbold
(74) *Attorney, Agent, or Firm* — Dentons US LLP

(57) ABSTRACT

A voice activated device for interaction with a digital assistant is provided. The device comprises a housing, one or more processors, and memory, the memory coupled to the one or more processors and comprising instructions for automatically identifying and connecting to a digital assistant server. The device further comprises a power supply, a wireless network module, and a human-machine interface. The human-machine interface consists essentially of: at least one speaker, at least one microphone, an ADC coupled to the microphone, a DAC coupled to the at least one speaker, and zero or more additional components selected from the set consisting of: a touch-sensitive surface, one or more cameras, and one or more LEDs. The device is configured to act as an interface for speech communications between the user and a digital assistant of the user on the digital assistant server.

31 Claims, 7 Drawing Sheets

(56) References Cited

U.S. PATENT DOCUMENTS

| | | |
|---|---|---|
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh et al. |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |

(56) References Cited

U.S. PATENT DOCUMENTS

| | | |
|---|---|---|
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,324,514 B2 * | 11/2001 | Matulich ............... G10L 15/22 704/275 |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,772,123 B2 | 8/2004 | Cooklev et al. |
| 6,778,951 B1 | 8/2004 | Contractor |
| 6,778,952 B2 | 8/2004 | Bellegarda |
| 6,778,962 B1 | 8/2004 | Kasai et al. |

(56) References Cited

U.S. PATENT DOCUMENTS

| | | |
|---|---|---|
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,839,669 B1 * | 1/2005 | Gould .................. G10L 15/22 704/246 |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,664,638 B2 | 2/2010 | Cooper et al. |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longe et al. |
| 7,890,652 B2 | 2/2011 | Bull et al. |
| 7,912,702 B2 | 3/2011 | Bennett |

(56) References Cited

U.S. PATENT DOCUMENTS

| | | | |
|---|---|---|---|
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longe et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,340,975 B1* | 12/2012 | Rosenberger ........... G10L 15/22 704/270 |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,452,597 B2* | 5/2013 | Bringert ................. G10L 15/28 704/231 |
| 8,762,145 B2* | 6/2014 | Ouchi ...................... G01S 3/80 704/233 |
| 8,798,995 B1* | 8/2014 | Edara ................. G06Q 30/0255 704/211 |
| 8,983,383 B1* | 3/2015 | Haskin ................. H04M 1/6041 455/41.2 |
| 8,996,381 B2* | 3/2015 | Mozer ..................... G10L 15/22 704/231 |
| 9,098,467 B1* | 8/2015 | Blanksteen ............. G10L 15/00 |
| 2001/0047264 A1 | 11/2001 | Roundtree |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0116185 A1 | 8/2002 | Cooper et al. |
| 2002/0116189 A1 | 8/2002 | Yeh et al. |
| 2002/0164000 A1 | 11/2002 | Cohen et al. |
| 2002/0198714 A1 | 12/2002 | Zhou |
| 2003/0088414 A1 | 5/2003 | Huang et al. |
| 2003/0097210 A1 | 5/2003 | Horst et al. |
| 2003/0135740 A1 | 7/2003 | Talmor et al. |
| 2004/0135701 A1 | 7/2004 | Yasuda et al. |
| 2004/0199387 A1 | 10/2004 | Wang et al. |
| 2004/0210442 A1* | 10/2004 | Glynn .................. G06Q 10/087 704/275 |
| 2004/0220798 A1 | 11/2004 | Chi et al. |
| 2004/0236778 A1 | 11/2004 | Junqua et al. |
| 2005/0002507 A1 | 1/2005 | Timmins et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | Di Fabbrizio et al. |
| 2005/0182629 A1 | 8/2005 | Coorman et al. |
| 2005/0196733 A1 | 9/2005 | Budra et al. |
| 2005/0273626 A1 | 12/2005 | Pearson et al. |
| 2005/0288936 A1 | 12/2005 | Busayapongchai et al. |
| 2006/0018492 A1 | 1/2006 | Chiu et al. |
| 2006/0053007 A1* | 3/2006 | Niemisto ................ G10L 25/78 704/233 |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0235700 A1 | 10/2006 | Wong et al. |
| 2007/0041361 A1 | 2/2007 | Iso-Sipila |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015863 A1* | 1/2008 | Agapi ..................... G10L 15/22 704/275 |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0046250 A1* | 2/2008 | Agapi ................... G10L 15/075 704/275 |
| 2008/0052063 A1 | 2/2008 | Bennett et al. |
| 2008/0082332 A1 | 4/2008 | Mallett et al. |
| 2008/0082338 A1 | 4/2008 | O'Neil et al. |
| 2008/0120112 A1 | 5/2008 | Jordan et al. |
| 2008/0129520 A1 | 6/2008 | Lee |
| 2008/0140416 A1 | 6/2008 | Shostak |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0256613 A1 | 10/2008 | Grover |
| 2008/0300878 A1 | 12/2008 | Bennett |
| 2008/0319763 A1* | 12/2008 | Di Fabbrizio .......... G10L 15/28 704/275 |
| 2009/0006100 A1 | 1/2009 | Badger et al. |
| 2009/0006343 A1 | 1/2009 | Platt et al. |

(56) References Cited

U.S. PATENT DOCUMENTS

| | | |
|---|---|---|
| 2009/0018835 A1 | 1/2009 | Cooper et al. |
| 2009/0030800 A1 | 1/2009 | Grois |
| 2009/0043580 A1* | 2/2009 | Mozer .................. G10L 15/26 704/251 |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0204409 A1 | 8/2009 | Mozer et al. |
| 2009/0216540 A1* | 8/2009 | Tessel .................. G10L 15/22 704/275 |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0088100 A1 | 4/2010 | Lindahl |
| 2010/0131273 A1 | 5/2010 | Aley-Raz et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1* | 12/2010 | Van Os .................. G06F 3/167 704/9 |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0201385 A1* | 8/2011 | Higginbotham ...... G10L 13/043 455/563 |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0298585 A1 | 12/2011 | Barry |
| 2011/0306426 A1 | 12/2011 | Novak et al. |
| 2011/0313775 A1* | 12/2011 | Laligand ........ H04N 21/234336 704/275 |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271640 A1* | 10/2012 | Basir ................ H04M 1/72552 704/275 |
| 2012/0271676 A1 | 10/2012 | Aravamudan et al. |
| 2012/0311583 A1 | 12/2012 | Gruber et al. |
| 2012/0330661 A1 | 12/2012 | Lindahl |
| 2013/0006638 A1 | 1/2013 | Lindahl |
| 2013/0110518 A1 | 5/2013 | Gruber et al. |
| 2013/0110520 A1 | 5/2013 | Cheyer et al. |
| 2013/0191117 A1* | 7/2013 | Atti .......... G10L 25/84 704/226 |
| 2013/0218560 A1* | 8/2013 | Hsiao .......... G10L 21/0205 704/233 |
| 2013/0289994 A1* | 10/2013 | Newman ................ G10L 15/22 704/254 |
| 2014/0136195 A1* | 5/2014 | Abdossalami .......... G10L 15/26 704/235 |
| 2014/0278435 A1* | 9/2014 | Ganong, III ............ G10L 15/22 704/275 |

FOREIGN PATENT DOCUMENTS

| | | |
|---|---|---|
| DE | 19841541 B4 | 12/2007 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0570660 A2 | 11/1993 |
| EP | 0863453 A1 | 9/1998 |
| EP | 0559349 B1 | 1/1999 |
| EP | 1229496 A2 | 8/2002 |
| EP | 1245023 A1 | 10/2002 |
| EP | 2109295 A1 | 10/2009 |
| GB | 2293667 A | 4/1996 |
| JP | 6-19965 A | 1/1994 |
| JP | 2001-125896 A | 5/2001 |
| JP | 2002-24212 A | 1/2002 |
| JP | 2003-517158 A | 5/2003 |
| JP | 2009-36999 A | 2/2009 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| WO | 1995/002221 A1 | 1/1995 |

(56) References Cited

FOREIGN PATENT DOCUMENTS

| | | |
|---|---|---|
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/060435 A2 | 10/2000 |
| WO | 2000/060435 A3 | 4/2001 |
| WO | 2002/073603 A1 | 9/2002 |
| WO | 2006/129967 A1 | 12/2006 |
| WO | 2008/085742 A2 | 7/2008 |
| WO | 2008/109835 A2 | 9/2008 |
| WO | 2010/075623 A1 | 7/2010 |
| WO | 2011/088053 A2 | 7/2011 |

OTHER PUBLICATIONS

Cheyer, Adam, "About Adam Cheyer", available online at <http://www.adam.cheyer.com/about.html>, retrieved from Internet on Sep. 17, 2012, 2 pages.
Codd, E. F., "Databases: Improving Usability and Responsiveness—How About Recently", 1978, pp. 3-28.
Cohen et al., "An Open Agent Architecture", SRI International, 1994, pp. 1-8.
Coles et al., "Chemistry Question-Answering", Technical Note 9, Jun. 1969, 15 pages.
Coles et al., "Techniques for Information Retrieval Using an Inferential Question-Answering System with Natural Language Input", Technical Note74, Nov. 1972, 198 Pages.
Coles Stephen L., "The Application of Theorem Proving to Information Retrieval", Technical Note 51, Jan. 1971, 21 pages.
Conklin, "Hypertext: An Introduction and Survey", Computer Magazine, Sep. 1987, 25 pages.
Connolly et al., "Fast Algorithms for Complex Matrix Multiplication Using Surrogates", IEEE Transactions on Acoustics, Speech, and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Cox et al., "Speech and Language Processing for Next-Millennium Communications Services", Proceedings of the IEEE, vol. 88, No. 8, Aug. 2000, pp. 1314-1337.
Craig et al., "Deacon: Direct English Access and Control", AFIPS Conference Proceedings, vol. 29, Nov. 7-10, 1966, pp. 365-380.
Cutkosky et al., "PACT: An Experiment in Integrating Concurrent Engineering Systems", Jan. 1993, pp. 1-13.
Dar et al., "DTL's DataSpot: Database Exploration Using Plain Language", Proceedings of the 24th VLDB Conference, 1998, pp. 645-649.
Davis et al., "A Personal Handheld Multi-Modal Shopping Assistant", IEEE, 2006, 9 pages.
Decker et al., "Designing Behaviors for Information Agents", Jul. 6, 1996, pp. 1-15.
Decker et al., "Matchmaking and Brokering", May 16, 1996, pp. 1-19.
Deerwester et al., "Indexing by Latent Semantic Analysis", Journal of the American Society for Information Science, vol. 41, No. 6, Sep. 1990, 19 pages.
Deller, Jr., et al., "Discrete-Time Processing of Speech Signals", May 13, 1993, pp. 114-137.
Digital Equipment Corporation, "Open VMS Software Overview", Dec. 1995, 159 pages.
Domingue et al., "Web Service Modeling Ontology (WSMO)—An Ontology for Semantic Web Services", Position paper at the W3C Workshop on Frameworks for Semantics in Web Services, Jun. 9-10, 2005, 6 pages.
Donovan, Robert E., "A New Distance Measure for Costing Spectral Discontinuities in Concatenative Speech Synthesisers", 2001, 4 pages.

Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Elio et al., "On Abstract Task Models and Conversation Policies", 1999, pp. 1-10.
Epstein et al., "Natural Language Access to a Melanoma Data Base", Technical Note 171, Sep. 1978, 7 pages.
Ericsson et al., "Software Illustrating a Unified Approach to Multimodality and Multilinguality in the in-home Domain", Talk and Look: Tools for Ambient Linguistic Knowledge, Dec. 22, 2006, 127 pages.
Evi, "Meet Evi: The One Mobile App that Provides Solutions for Your Everyday Problems", avialable online at <http://www.evi.com/>, retrieved on Feb. 8, 2012, 3 pages.
Grosz et al., "Dialogic: A Core Natural-Language Processing System", SRI International, Nov. 9, 1982, 17 pages.
Exhibit, 1, "Natural Language Interface Using Constrained Intermediate Dictionary of Results", List of Publications Manually reviewed for the Search of U.S. Pat. No. 7,177,798, Mar. 22, 2013, 1 page.
Feigenbaum et al., "Computer-assisted Semantic Annotation of Scientific Life Works", Oct. 15, 2007, 22 pages.
Ferguson et al., "TRIPS: An Integrated Intelligent Problem-Solving Assistant,", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-based knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistancae", CiteSeerx, In Proc. of IUI'05, Jan. 9-12, 2005, pp. 90-97.
Glass et al., "Multilingual Language Generation Across Multiple Domains", International Conference on Spoken Language Processing, Japan, Sep. 18-22, 1994, 5 pages.
Glass et al., "Multilingual Spoken-Language Understanding in the Mit Voyager System", <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Goddeau et al., "A Form-Based Dialogue Manager for Spoken Language Applications", http://phasedance.com/pdf!icslp96.pdf, Oct. 1996, 4 pages.
Goddeau et al., "Galaxy: A Human-Language Interface to On-Line Travel Information", International Conference on Spoken Language Processing 1994, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gorin et al., "On Adaptive Acquisition of Language", International Conference on Acoustics, Speech, and Signal Processing (ICASSP'90), vol. 1, Apr. 3-6, 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.

(56) References Cited

OTHER PUBLICATIONS

Gregg et al., "DSS Access on the WWW: An Intelligent Agent Prototype", Proceedings of the Americas Conference on Information Systems—Association for Information Systems, 1998, 3 pages.
Grishman et al., "Computational Linguistics: An Introduction", © Cambridge University Press, 1986, 172 pages.
Lieberman et al., "Out of Context: Computer Systems that Adapt to, and Learn from, Context", IBM Systems Journal, vol. 39, No. 3&4, 2000, pp. 617-632.
Lin et al., "A Distributed Architecture for Cooperative Spoken Dialogue Agents with Coherent Dialogue State and History", <http://citeseerx.ist.psu.edu/viewdoc/summary?doi=1 0.1.1.42.272>, 1999, 4 pages.
Lin et al., "A New Framework for Recognition of Mandarin Syllables With Tones Using Sub-syllabic Units", IEEE International Conference on Acoustics, Speech, and Signal Processing (ICASSP-93), Apr. 27-30, 1993, pp. 227-230.
Linde, "An Algorithm for Vector Quantizer Design", IEEE Transactions on Communications, vol. 28, No. 1, Jan. 1980, pp. 84-95.
Liu et al., "Efficient Joint Compensation of Speech for the Effects of Additive Noise and Linear Filtering", IEEE International Conference of Acoustics, Speech, and Signal Processing,ICASSP-92, Mar. 23-26, 1992, pp. 257-260.
LNTRASPECT Software, "The Intraspect Knowledge Management Solution: Technical Overview", <http://tomgruber.org/writing/intraspect-whitepaper-1998.pdf>, 1998, 18 pages.
Logan et al., "Mel Frequency Cepstral Coefficients for Music Modeling", In International Symposium on Music Information Retrieval, 2000, 2 pages.
Lowegian International, "FIR Filter Properties", dspGuro, Digital Signal Processing Central, available online at <httJ;>://www.dspQuru.com/dso/taas/fir/orooerties, > retrived from internet on Jul. 28, 2010, 6 pages.
Lowerre, B. T., "The-HARPY Speech Recognition System", Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations", Revised Version of a Paper Presented at the Computational Phonology in Speech Technology workshop, 1996 annual meeting of the Association for Computational Linguistics in Santa Cruz, California, 7 pages.
Markel et al., "Linear Prediction of Speech", Springer-Verlag, Berlin Heidelberg New York, 1976, 12 pages.
Martin et al., "The Open Agent Architecture: A Framework for Building Distributed Software Systems", Applied Artificial Intelligence: An International Journal, vol. 13, No. 1-2, pp. 1-38.
Martin et al., "Building and Using Practical Agent Applications", SRI International, PAAM Tutorial, 1998, pp. 1-26.
Martin et al., "Building Distributed Software Systems with the Open Agent Architecture", Proceedings of the Third International Conference on the Practical Application of Intelligent Agents and Multi-Agent Technology, Mar. 23-25, 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the second International Conference on the Practical Application of Intelligent Agents and Multi-Agent Technology, Apr. 1997, pp. 1-20.
Martin et al., "Transportability and Generality in a Natural-Language Interface System", Proceedings of the Eight International Joint Conference on Artificial Intelligence, Technical Note 293, Aug. 8-12, 1983, 21 pages.
Matiasek et al., "Tamic-P: A System for NL Access to Social Insurance Database", 4th International Conference on Applications of Natural Language to Information Systems, Jun. 17-19, 1999, 7 pages.

McGuire et al., "SHADE: Technology for Knowledge-Based Collaborative Engineering", Journal of Concurrent Engineering~r Applications and Research (CERA), 1993, 18 pages.
Meng et al., "Wheels: A Conversational System in the Automobile Classified Domain", Proceedings Fourth International Conference on Spoken Language, 1996. ICSLP 96, Oct. 1996, pp. 542-545.
Michos et al., "Towards an Adaptive Natural Language Interface to Command Languages", Natural Language Engineering, vol. 2, No. 3, 1996, pp. 191-209.
Milstead et al., "Metadata: Cataloging by Any Other Name", Online, Information Today, Inc., Jan. 1999, 18 pages.
Milward et al., "D2.2: Dynamic MultimodalInterface Reconfiguration" Talk and Look: Tools for Ambient Linguistic Knowledge, IST-507802 Deliverable D2.2, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Lecture Notes in Computer Science, vol. 1777, 2000, pp. 86-100.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, ArtificialIntelliqence Center, 1995, 4 pages.
Moore et al., "SRI's Experience with the ATIS Evaluation", Proceedings of the workshop on Speech and Natural Language, Jun. 24-27, 1990, pp. 147-148.
Moore et al., "The Information Warefare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-based User Interfaces", Proceedings of International Workshop on Human Interface Technology, Oct. 12-13, 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Copyright © 1990 Apple Computer, Inc. Addison-Wesley Publishing Company, Inc, 1990, 17 pages.
Mozer, Michael C., "An Intelligent Environment Must be Adaptive", IEEE Intelligent Systems, Mar./Apr. 1999, pp. 11-13.
Muhlhauser, Max, "Context Aware Voice User Interfaces for Workflow Support", 2007, 254 pages.
Murty, "Combining Evidence from Residual Phase and MFCC Features for Speaker Recognition", IEEE Signal Processing Letters, vol. 13, No. 1, Jan. 2006, pp. 52-55.
Murveit et al., "Integrating Natural Language Constraints into HMM-based Speech Recognition", 1990 International Conference on Acoustics, Speech, and Signal Processing, Apr. 3-6, 1990, 5 pages.

(56) References Cited

OTHER PUBLICATIONS

Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics Speech and Signal Processing ICASSP, Mar. 14-19, 2010, pp. 4502-4505.
Naone, Erica, "TR10: Intelligent Software Assistant", Technology Review, Mar.-Apr. 2009, 2 pages.
Neches et al., "Enabling Technology for Knowledge Sharing", Fall, 1991, pp. 37-56.
Niesler et al., "A Variable-Length Category-Based N-Gram Language Model", IEEE International Conference on Acoustics, Speech, and Signal Processing (ICASSP'96), vol. 1, May 7-10, 1996, pp. 164-167.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE—A Scalable Agent-Based Information Retrieval Engine", Proceedings of the First International Conference on Autonomous Agents, 1997, 12 pages.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", available online at <http://citeseerx.ist.psu.edu/messaqes/downloadsexceeded.html>, Nov. 14, 1997, 21 pages.
Parsons, T. W., "Voice and Speech Processing", Pitch and Formant Estimation © 1987, McGraw-Hill, Inc., ISBN: 0-07-0485541-0, 1987, 15 pages.
Parsons,, T. W., "Voice and Speech Processin", Linguistics and Technical Fundamentals, Articulatory Phonetics and Phonemics, © 1987 McGraw-Hill, Inc., ISBN: 0-07-0485541-0, 5 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Search Report received for PCT Patent Application No. PCT/US1993/012666, dated Nov. 9, 1994, 8 pages.
International Preliminary Report on Patentability received for PCT Patent Application No. PCT/US1994/011011, dated Feb. 28, 1996, 4 pages.
International Search Report received for PCT Patent Application No. PCT/US1994/011011, dated Feb. 8, 1995, 7 pages.
Written Opinion received for PCT Patent Application No. PCT/US1994/011011, dated Aug. 21, 1995, 4 pages.
International Preliminary Report on Patentability received for PCT Patent Application No. PCT/US1995/008369, dated Oct. 9, 1996, 4 pages.
International Search Report received for PCT Patent Application No. PCT/US1995/008369, dated Nov. 8, 1995, 6 pages.
International Search Report and Written Opinion received for PCT Patent Application No. PCT/US2011/020861, dated Nov. 29, 2011, 12 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
Phoenix Solutions, Inc., A, "Declaration of Christopher Schmandt Regarding the MIT Galaxy System", West Interactive Corporation, a Delaware Corporation, Document 40, Jul. 2, 2010, 162 pages.
Picone, J., "Continuous Speech Recognition Using Hidden Markov Models", IEEE ASSP Magazine, vol. 7, No. 3, Jul. 1990, 16 pages.
Pulman et al., "Clare: A Combined Language and Reasoning Engine", Proceedings of JFIT Conference, available online at <URL: http://www.cam.sri.com/tr/crc042/paper.ps.Z>, 1993, 8 pages.
Rabiner et al., "Fundamental of Speech Recognition", © 1993 AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Ratcliffe, M., "ClearAccess 2.0 allows SQL searches off-line (Structured Query Language)", ClearAcess Corp., MacWeek, vol. 6, No. 41, Nov. 16, 1992, 2 pages.
Ravishankar, "Efficient Algorithms for Speech Recognition", Doctoral Thesis submitted to School of Computer Science, Computer Science Division, Carnegie Mellon University, Pittsburg, May 15, 1996, 146 pages.
Rayner et al., "Adapting the Core Language Engine to French and Spanish", Cornell University Library, available online at <http:l/arxiv.org/abs/cmp-lg/9605015.>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation With Mid-90's Technology: A Case Study", EUROSPEECH, ISCA, available online at <http:// db 1 p. u n i-trier. de/d b/conf/interspeech/eurospeech 1993.html#RaynerBCCDGKKLPPS93>, 1993, 4 pages.
Rayner, M., "Abductive Equivalential Translation and its application to Natural Language Database Interfacing", Dissertation paper, SRI International, Sep. 1993, 163 pages.
Rayner, M., "Linguistic Domain Theories: Natural-Language Database Interfacing from First Principles", SRI International, Cambridge, 1993, 11 pages.
Remde et al., "SuperBook: An Automatic Tool for Information Exploration—Hypertext?", In Proceedings of Hypertext '87, Nov. 13-15, 1987, 14 pages.
Reynolds, C. F., "On-Line Reviews: A New Application of the HICOM Conferencing System", IEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, Available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rigoll, G., "Speaker Adaptation for Large Vocabulary Speech Recognition Systems Using Speaker Markov Models", International Conference on Acoustics, Speech, and Signal Processing (ICASSP'89), May 23-26, 1989, 4 pages.
Riley, M D., "Tree-Based Modelling of Segmental Durations", Talking Machines Theories, Models, and Designs, 1992 © Elsevier Science Publishers B.V., North-Holland, ISBN: 08-444-89115.3, 1992, 15 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech, and Signal Processing (ICASSP'79), Apr. 1979, 5 pages.
Roddy et al., "Communication and Collaboration in a Landscape of B2B eMarketplaces", VerticaiNet Solutions, white paper, Jun. 15, 2000, 23 pages.
Rosenfeld, R., "A Maximum Entropy Approach to Adaptive Statistical Language Modelling", Computer Speech and Language, vol. 10, No. 3, Jul. 1996, 25 pages.
Roszkiewicz, A., "Extending your Apple", Back Talk—Lip Service, A+ Magazine, The Independent Guide for Apple Computing, vol. 2, No. 2, Feb. 1984, 5 pages.

(56) References Cited

OTHER PUBLICATIONS

Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approac", © 1995 Prentice Hall, Inc., 1995, 121 pages.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech, and Signal Processing, vol. ASSP-26 No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with security attributes and privilege delegation Access control beyond the ACL", Computer Communications, vol. 20, 1997, 9 pages.
San-Segundo et al., "Confidence Measures for Dialogue Management in the CU Communicator System", Proceedings of Acoustics, Speech, and Signal Processing (ICASSP'00), Jun. 5-9, 2000, 4 pages.
Sato, H., "A Data Model, Knowledge Base, and Natural Language Processing for Sharing a Large Statistical Database,", Statistical and Scientific Database Management, Lecture Notes in Computer Science, vol. 339, 1989, 20 pages.
Ward et al., "Recent Improvements in the CMU Spoken Language Understanding System", ARPA Human Language Technology Workshop, 1994, pp. 213-216.
Ward, Wayne, "The CMU Air Travel Information Service: Understanding Spontaneous Speech", Proceedings of the Workshop on Speech and Natural Language, HLT '90, 1990, pp. 127-129.
Warren, "An Efficient Easily Adaptable System for Interpreting Natural Language Queries", American Journal of Computational Linguistics, vol. 8, No. 3-4, Jul.-Dec. 1982, pp. 110-119.
Weizenbaum, Joseph, "ELIZA—A Computer Program for the Study of Natural Language Communication Between Man and Machine", Communications of the ACM, vol. 9, No. 1, Jan. 1966, pp. 36-45.
Werner et al., "Prosodic Aspects of Speech," Universite de Lausanne, Switzerland, 1994, Fundamentals of Speech Synthesis and Speech Recognition: Basic Concepts, State of the Art, and Future Challenges, 1994, pp. 23-40.
Winiwarter et al., "Adaptive Natural Language Interfaces to FAQ Knowledge Bases", Proceedings of 4th International Conference on Applications of Natural Language to Information Systems, Austria, Jun. 17-19, 1999, 22 pages.
Wolff, Mark, "Poststructuralism and the ARTFUL Database: Some Theoretical Considerations", Information Technology and Libraries, vol. 13, No. 1, Mar. 1994, 10 pages.
Wu et al., "KDA: A Knowledge-based Database Assistant", Data Engineering, Proceeding of the Fifth International Conference on Engineering (IEEE Cat No. 89CH2695-5), Feb. 6-10, 1989, pp. 402-409.
Wu, Min, "Digital Speech Processing and Coding", ENEE408G Capstone-Multimedia Signal Processing, Spring 2003, Lecture-2 Course Presentation, University of Maryland, College Park, 2003, pp. 1-8.
Wu, Min, "Speech Recognition, Synthesis, and H.C.I.", ENEE408G Capstone-Multimedia Signal Processing, Spring 2003, Lecture-3 course presentation, University of Maryland, College Park, 2003, pp. 1-11.
Wyle, M. F., "A Wide Area Network Information Filter", In Proceedings of First International Conference on Artificial Intelligence on Wall Street, Oct. 9-11, 1991, pp. 10-15.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", IEEE Computer Magazine, Jan. 1988, pp. 81-96.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995, 13 pages.
Zhao Leon., "Intelligent Agents for Flexible Workflow Systems", Proceedings of the Americas Conference on Information Systems (AMCIS), 1998, pp. 237-239.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zovato et al., "Towards Emotional Speech Synthesis: A Rule based Approach", Proceedings 5th ISCA Speech Synthesis Workshop—Pittsburgh, 2004, pp. 219-220.
Zue et al., "From Interface to Content: Translingual Access and Delivery of On-Line Information", EUROSPEECH, 1997, 4 pages.
Zue et al., "Jupiter: A Telephone-Based Conversational Interface for Weather Information", IEEE Transactions on Speech and Audio Processing, Jan. 2000, pp. 100-112.
Zue et al., "Pegasus: A Spoken Dialogue Interface for On-Line Air Travel Planning", Elsevier, Speech Communication, vol. 15, 1994, 10 pages.
Zue et al., "The Voyager Speech Understanding System: Preliminary Development and Evaluation", Proceedings of IEEE 1990 International Conference on Acoustics, Speech, and Signal Processing, 1990, pp. 73-76.
Zue, Victor, "Conversational Interfaces: Advances and Challenges", Spoken Language System Group <http://www.cs.cmu.edu/-dod/papers/zue97.pdf>, Sep. 1997, 10 pages.
Zue, Victor W., "Toward Systems that Understand Spoken Language", ARPA Strategic Computing Institute, Feb. 1994, pp. 51-59.
Grosz et al., "Research on Natural-Language Processing at SRI", SRI International Technical Note 257, Nov. 1981, 21 pages.
Grosz et al., "TEAM: An Experiment in the Design of Transportable Natural-Language Interfaces", Artificial Intelligence, vol. 32, 1987, pp. 173-243.
Grosz, Barbara J., "Team: A Transportable Natural-Language Interface System", Proceedings of the First Conference on Applied Natural Language Processing, 1983, pp. 39-45.
Gruber et al., "An Ontology for Engineering Mathematics", Fourth International Conference on Principles of Knowledge Representation and Reasoning, Available at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", In Proc. International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 22-25, 1992, pp. 1-19.
Gruber et al., "A Translation Approach to Portable Ontology Specifications", Knowledge Systems Laboratory, Technical Report KSL 92-71, Sep. 1992, Revised Apr. 1993, 27 pages.
Gruber, Thomas R., "Automated Knowledge Acquisition for Strategic Knowledge", Machine Learning, vol. 4, 1989, pp. 293-336.
Gruber, Thomas R., Interactive Acquisition of Justifications: Learning "Why" by Being Told "What", Knowledge Systems Laboratory, Technical Report KSL 91-17, Original Oct. 1990, Revised Feb. 1991, pp. 1-23.
Gruber, Thomas R., "Toward Principles for the Design of Ontologies Used for Knowledge Sharing", In International Journal Human-Computer Studies, vol. 43, p. 907-928, substantial revision of paper presented at the International Workshop on Formal Ontology, Avail-

(56) References Cited

OTHER PUBLICATIONS able as Technical Report KSL 93-04, Knowledge Systems Laboratory, revised Aug. 23, 1993, 23 pages.
Gruber, Tom, "(Avoiding) the Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available Online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote presentation at Web 3.0 conference, 2009, 41 pages.
Gruber, Tom, "Collaborating around Shared Content on the WWW", W3C Workshop on WWW and Collaboration, Available at <http://www.w3.org/Collaboration/Workshop/Proceedings/P9.html>, Sep. 11, 1995, 1 page.
Gruber, Tom, "Collective Knowledge Systems: Where the Social Web meets the Semantic Web", Web Semantics: Science, Services and Agents on the World Wide Web, 2007, pp. 1-19.
Gruber, Tom, "Despite our Best Efforts, Ontologies are not the Problem", AAAI Spring Symposium, Available at <http://tomgruber.org/writing/aaai-ss08.htm>, 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, intraspect, available at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available at <http://tomgruber.org/writing/semtech08.htm>, 2008, pp. 1-40.
Gruber, Tom, "It Is What It Does: The Pragmatics of Ontology for Knowledge Sharing", Proceedings of the International CIDOC CRM Symposium, Available at <http://tomgruber.org/writing/cidoc-ontology.htm>, Mar. 26, 2003, 21 pages.
Gruber, Tom, "Ontologies, Web 2.0 and Beyond", Ontology Summit, available at <http://tomgruber.org/writing/ontolog-social-web-keynote.htm>, Apr. 24, 2007, 17 pages.
Gruber, Tom, "Ontology of Folksonomy: A Mash-up of Apples and Oranges", Int'l Journal on Semantic Web & Information Systems, vol. 3, No. 2, 2007, 7 pages.
Gruber, Tom, "Siri, a Virtual Personal Assistant—Bringing Intelligence to the Interface", Semantic Technologies conference, Jun. 16, 2009, 21 pages.
Gruber, Tom, "TagOntology", Presentation to Tag Camp, Oct. 29, 2005, 20 pages.
Gruber, Tom, "Where the Social Web meets the Semantic Web", Presentation at the 5th International Semantic Web Conference, Nov. 7, 2006, 38 pages.
Guida et al., "NLI: A Robust Interface for Natural Language Person-Machine Communication", Int. J. Man-Machine Studies, vol. 17, 1982, pp. 417-433.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: tools and Applications, Paris, 2007, Sauramps Medical, http://lsro.epfl.ch/page-68384-en.html,, 2007, 8 pages.
Guzzoni et al., "Active, A Platform for Building Intelligent Software,", Computational Intelligence, available online at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, <http://lsro.epfl.ch/page-34241.html>, 2007, 6 pages.
Guzzoni et al., "Many Robots Make Short Work", AAAI Robot Contest, SRI International, 1996, pp. 1-9.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A unified platform for building intelligent assistant applications", Oct. 25, 2007, 262 pages.
Haas et al., "An Approach to Acquiring and Applying Knowledge", SRI international Technical Note 227, Nov. 1980, 22 pages.
Hadidi et al., "Students' Acceptance of Web-Based Course Offerings: An Empirical Assessment", Proceedings of the Americas Conference on Information Systems (AMCIS), 1998, 4 pages.
Hardwar, Devemder, "Driving App Waze Builds its own Siri for Hands-Free Voice Control", retrieved from internet on Feb. 9, 2012 <http ://ventu rebeat. com/20 12/0 2/09/ driving-a pp-waze-bu i lds-its-own-siri-for -hands-freevoice-control/>, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hawkins et al., "Hierarchical Temporal Memory: Concepts, Theory, and Terminology", Numenta, Inc., Mar. 27, 2007, pp. 1-20.
He et al., "Personal Security Agent: KQML-Based PKI", The Robotics Institute, Carnegie-Mellon University, paper, 1997, pp. 1-14.
Helm et al., "Building Visual Language Parsers", In Proceedings of CHI'91 Proceedings of the SIGCHI Conference on Human Factors in Computing Systems, 1991, pp. 105-112.
Hendrix et al., "Developing a Natural Language Interface to Complex Data", ACM Transactions on Database Systems, vol. 3, No. 2, Jun. 1978, pp. 105-147.
Hendrix et al., "Transportable Natural-Language Interfaces to Databases", SRI International, Technical Note 228, Apr. 30, 1981, 18 pages.
Hendrix et al., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Savoy, J., "Searching Information in Hypertext Systems Using Multiple Sources of Evidence", International Journal of Man-Machine Studies, vol. 38, No. 6, Jun. 1996, pp. 1017-1030.
Scagliola, C., "Language Models and Search Algorithms for Real-Time Speech Recognition", International Journal of Man-Machine Studies, vol. 22, No. 5, 1985, pp. 523-547.
Schmandt et al., "Augmenting a Window System with Speech Input", IEEE Computer Society, Computer, vol. 23, No. 8, Aug. 1990, pp. 50-56.
Ward et al., "A Class Based Language Model for Speech Recognition", Conference Proceedings International Conference on Acoustics, Speech, and Signal Processing, 1996, ICASSP-96 , pp. 416-418.
Schütze, H., "Dimensions of Meaning", Proceedings of Supercomputing'92 Conference, Nov. 16-20, 1992, 10 pages.
Seneff et al., "A New Restaurant Guide Conversational System: Issues in Rapid Prototyping for Specialized Domains", Proceedings of Fourth International Conference on Spoken Language, 1996. ICSLP 96, 1996, pp. 665-668.

(56) References Cited

OTHER PUBLICATIONS

Sharoff et al., "Register-domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", In Proceedings of the Ninth Conference on Artificial Intelligence for Applications, Mar. 1-5, 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation Through Vector Quantization", IEEE International Conference on Acoustics, Speech, and Signal Processing (ICASSP'86), vol. 11, Apr. 1986, 4 pages.
Shimazu et al., "CAPIT: Natural Language Interface Design Tool with Keyword Analyzer and Case-Based Parser,", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "Info Harness: Use of Automatically Generated Metadata for Search and Retrieval of Heterogeneous Information", 1995 Proceedings of CAiSE'95, Finland, 1995.
Sigurdsson et al., "Mel Frequency Cepstral Coefficients: An Evaluation of Robustness of MP3 Encoded Music", In Proceedings of the 7th International Conference on Music Information Retrieval ISMIR, 2006, 4 pages.
Silverman et al., "Using a Sigmoid Transformation for Improved Modeling of Phoneme Duration", Proceedings of the IEEE International Conference on Acoustics, Speech, and Signal Processing, Mar. 15-19, 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture.TM. 1.0 Distribution", Open Agent Architecture (OAA), 1999, 2 pages.
SRI2009, "SRI Speech: Products: Software Development Kits: EduSpeak", available a <http://web.archive.org/web/20090828084033/http://www.speechatsri.com/products/eduspeak> shtml., 2009, 2 pages.
Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, "A Nonclausal Connection-Graph Resolution Theorem-Proving Program", Proceedings of AAAI'82, 1982, pp. 1-13.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, Jun. & Sep. 1996, 33 pages.
Sycara et al., "Distributed Intelligent Agents", IEEE Expert, vol. 11, No. 6, Dec. 1996, 32 pages.
Sycara et al., "Dynamic Service Matchmaking Among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", 1981 Prentice-Hall, Inc, 1981, 34 pages.
Tofel et al., "SpeakToIt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man, and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech, and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1, 1994, 9 pages.
Van Santen, J. P., "Contextual Effects on Vowel Duration", Journal Speech Communication, vol. 11, No. 6, Dec. 1992, 34 pages.
Vepa et al., "New Objective Distance Measures for Spectral Discontinuities in Concatenative Speech Synthesis", In Proceedings of the IEEE 2002 Workshop on Speech Synthesis, 2002, 4 pages.
Verschelde, J., "MATLAB Lecture 8. Special Matrices in MATLAB,", UIC Dept. of Math., Stat. & C.S., MCS 320, Introduction to Symbolic Computation, Nov. 23, 2005, 4 pages.
Vingron, M., "Near-Optimal Sequence Alignment", Deutsches Krebsforschungszentrum (DKFZ), Abteilung Theoretische Bioinformatik, Heidelberg, Germany, Jun. 1996, 20 pages.
Vlingo, "Vlingo Launches Voice Enablement Application on Apple App Store", Press Release, Dec. 3, 2008, 2 pages.
Vlingo LNCAR, "Distracted Driving Solution with Vlingo InCar", YouTube by Vlingo Voice on (Oct. 6, 2010) 2:38 minute video uploaded to Retrieved from Internet on Jun. 6, 2012<http://www.youtube.com/watch?v=Vqs8XfXxgz4?, 2 pages.
Wahlster et al., "Smartkom: Multimodal Communication with a Life-Like Character,", EUROSPEECH—Scandinavia, 7th European Conference on Speech Communication and Technology, 2001, 5 pages.
Waldinger et al., "Deductive Question Answering from Multiple Resources", New Directions in Question Answering, published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", © 1978 ACM, vol. 21, No. 7, 1978, 14 pages.
Hermansky, H., "Perceptual Linear Predictive (PLP) Analysis of Speech", Journal of the Acoustical Society of America, vol. 87, No. 4, Apr. 1990, pp. 1738-1752.
Hermansky, H., "Recognition of Speech in Additive and Convolutional Noise Based on Rasta Spectral Processing", In proceedings of IEEE International Conference on Acoustics, speech and Signal Processing (ICASSP'93), Apr. 27-30, 1993, pp. II-83-II-86.
Hirschman et al., "Multi-Site Data Collection and Evaluation in Spoken Language Understanding", Proceedings of the workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for Use with an Agent-Oriented Natural Language Interface", Proceedings of HCI International, vol. 4, Jun. 22-27, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition—Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech, and Signal Processing (ICASSP-91), Apr. 14-17, 1991, pp. 889-892.

(56) References Cited

OTHER PUBLICATIONS

Huang et al., "The SPHINX-II Speech Recognition System: An Overview", Computer, Speech and Language, Jan. 15, 1992, pp. 1-12.

Issar et al., "CMU's Robust Spoken Language Understanding System", Proceedings of Eurospeech, 1993, 4 pages.

Issar, Sunil, "Estimation of Language Models for New Spoken Language Applications", Proceedings of 4th International Conference on Spoken language Processing, Oct. 3-6, 1996, 4 pages.

Jacobs et al., "Scisor: Extracting Information from On-Line News", Communications of the ACM, vol. 33, No. 11, Nov. 1990, pp. 88-97.

Janas, Jurgen M., "The Semantics-Based Natural Language Interface to Relational Databases", Chapter 6, Cooperative Interfaces to Information Systems, 1986, pp. 143-188.

Jelinek, F., "Self-Organized Language Modeling for Speech Recognition,", Readings in Speech Recognition, edited by Alex Waibel and Kai-Fu Lee, Morgan Kaufmann Publishers, Inc., ISBN: 1-55860-124-4, May 15, 1990, 63 pages.

Jennings et al., "A Personal News Service Based on a User Model Neural Network", IEICE Transactions on Information and Systems, vol. E75-D, No. 2, Tokyo, JP, Mar. 1992, pp. 198-209.

Ji et al., "A Method for Chinese Syllables Recognition based upon Sub-syllable Hidden Markov Model", 1994 International Symposium on Speech, Image Processing and Neural Networks, Hong Kong, Apr. 13-16, 1994, pp. 730-733.

Johnson, Julia A., "A Data Management Strategy for Transportable Natural Language Interfaces", Doctoral thesis submitted to the Department of Computer Science, University of British Columbia, Canada, Jun. 1989, 285 pages.

Jones, J., "Speech Recognition for Cyclone", Apple Computer, Inc., E.R.S.Revision 2.9, Sep. 10, 1992, 93 pages.

Julia et al., "http://www.speech.siri.com/demos/atis.html", Proceedings of AAAI, Spring Symposium, 1997, 5 pages.

Julia et al., "Un editeur interactif de tableaux dessines a main levee (An Interactive Editor for Hand-Sketched Tables)", Traitement du Signal, vol. 12, No. 6, 1995, pp. 619-626.

Kahn et al., "CoABS Grid Scalability Experiments", Autonomous Agents and Multi-Agent Systems, vol. 7, 2003, pp. 171-178.

Kamel et al., "A Graph Based Knowledge Retrieval System", IEEE International Conference on Systems, Man and Cybernetics, 1990, pp. 269-275.

Karp, P. D., "A Generic Knowledge-Base Access Protocol", <http://lecture.cs.buu.ac.th/-f50353/Document/gfp.pdf>, May 12, 1994, 66 pages.

Kats et al., "Exploiting Lexical Regularities in Designing Natural Language Systems", In the Proceedings of the 12th International Conference on Computational Linguistics, 1988, pp. 1-22.

Katz et al., "REXTOR: A System for Generating Relations from Natural Language", In Proceedings of the ACL Workshop on Natural Language Processing and Information Retrieval (NLP&IR), Oct. 2000, 11 pages.

Katz, Boris, "A Three-Step Procedure for Language Generation", Massachusetts Institute of Technology, A.I. Memo No. 599, Dec. 1980, pp. 1-40.

Katz, Boris, "Annotating the World Wide Web Using Natural Language", In Proceedings of the 5th RIAO Conference on Computer Assisted Information Searching on the Internet, 1997, 7 pages.

Katz, Boris, "Using English for Indexing and Retrieving", Proceedings of the 1st RIAO Conference on User-Oriented Content-Based Text and Image Handling, 1988, pp. 314-332.

Katz, Slava. M., "Estimation of Probabilities from Sparse Data for the Language Model Component of a Speech Recognizer", IEEE Transactions on Acoustics, Speech, and Signal Processing, vol. ASSP-35, No. 3, Mar. 1987, 3 pages.

Kickstarter, "Ivee Sleek: Wi-Fi Voice-Activated Assistant", available online at <https://www.kickstarter.com/projects/ivee/ivee-sleek-wi-fi-voice-activated-assistant> retrived from internet on Feb. 10, 2014, 13 pages.

Kitano, H., "φDM-Dialog: An Experimental Speech-to-Speech Dialog Translation System", Computer, vol. 24, No. 6, Jun. 1991, 13 pages.

Klabbers et al., "Reducing Audible Spectral Discontinuities", IEEE Transactions on Speech and Audio Processing, vol. 9, No. 1, Jan. 2001, pp. 39-51.

Klatt Dennis H., "Linguistic Uses of Segmental Duration in English: Acoustic and Perpetual Evidence", Journal of the Acoustical Society of America, vol. 59, No. 5, May 1976, pp. 1208-1221.

Kominek et al., "Impact of Durational Outlier Removal from Unit Selection Catalogs", 5th ISCA Speech Synthesis Workshop, Jun. 14-16, 2004, pp. 155-159.

Konolige, Kurt, "A Framework for a Portable Natural-Language Interface to Large Data Bases", SRI International, Technical Note 197, Oct. 12, 1979, 54 pages.

Kubala et al., "Speaker Adaptation from a Speaker-Independent Training Corpus", International Conference on Acoustics, Speech, and Signal Processing (ICASSP'90), Apr. 3-6, 1990, 4 pages.

Kubala et al., "The Hub and Spoke Paradigm for CSR Evaluation", Proceedings of the Spoken Language Technology Workshop, Mar. 6-8, 1994, 9 pages.

Laird et al., "SOAR: An Architecture for General Intelligence", Artificial Intelligence, vol. 33, 1987, pp. 1-64.

Langly et al., "A Design for the ICARUS Architechture", SIGART Bulletin, vol. 2, No. 4, 1991, pp. 104-109.

Larks, "Intelligent Software Agents", Available Online at <http://www.cs.cmu.edu/~softagents/larks.html> retrieved on Mar. 15, 2013, 2006, 2 pages.

Lee et al., "A Real-Time Mandarin Dictation Machine for Chinese Language with Unlimited Texts and Very Large Vocabulary", International Conference on Acoustics, Speech and Signal Processing, vol. 1, Apr. 3-6, 1990, 5 pages.

Lee et al., "Golden Mandarin(II)—An Improved Single-Chip Real-Time Mandarin Dictation Machine for Chinese Language with Very Large Vocabulary", 0-7803-0946-4/93 © 1993 1EEE, 1993, 4 pages.

Lee et al., "Golden Mandarin(II)—An Intelligent Mandarin Dictation Machine for Chinese Character Input with Adaptation/Learning Functions", International Symposium on Speech, Image Processing and Neural Networks, Hong Kong, Apr. 13-16, 1994, 5 pages.

Lee et al., "System Description of Golden Mandarin (I) Voice Input for Unlimited Chinese Characters", International Conference on Computer Processing of Chinese & Oriental Languages, vol. 5, Nos. 3 & 4, Nov. 1991, 16 pages.

Lee, K. F., "Large-Vocabulary Speaker-Independent Continuous Speech Recognition: The SPHINX System", Partial Fulfillment of the requirements for the degree of Doctor of Philosophy, Computer Science Department, Carnegie Mellon University, Apr. 18, 1988, 195 pages.

Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.

Leong et al., "CASIS: A Context-Aware Speech Interface System", Proceedings of the 10th International Conference on Intelligent user Interfaces, San Diego, California, Jan. 9-12, 2005, pp. 231-238.

"Integrated Audio-Graphics User Interface", IBM Technical Disclosure Bulletin, vol. 33, No. 11, Apr. 1991, pp. 368-371.

"Interactive Voice", available online at <http://www.helloivee.com/company/> retrieved from internet on Feb. 10, 2014, 2 pages.

"Meet Ivee Your Wi-Fi Voice Activated Assistant", available online at <http://www.helloivee.com/> retrieved from internet on Feb. 10, 2014, 8 pages.

"Mel Scale", Wikipedia the Free Encyclopedia, last modified on Oct. 13, 2009 and retrieved on Jul. 28, 2010, available online <http://en.wikipedia.org/wiki/Mel_scale>, 2 pages.

"Minimum Phase", Wikipedia the free Encyclopedia, Last Modified on Jan. 12, 2010 and retrieved on Jul. 28, 2010, available online at <http://en.wikipedia.org/wiki/Minimum_phase>, 8 pages.

"Speech Editor", IBM Technical Disclosure Bulletin, vol. 29, No. 10, Mar. 1987, pp. 4512-4514.

"Speech Recognition with Hidden Markov Models of Speech Waveforms", IBM Technical Disclosure Bulletin, vol. 34, No. 1, Jun. 1991, pp. 7-16.

(56) References Cited

OTHER PUBLICATIONS

Ex-Parte Quayle Action received for U.S. Appl. No. 12/244,713, mailed on Sep. 10, 2012, 5 pages.
Non Final Office Action received for U.S. Appl. No. 12/244,713, dated Dec. 23, 2011, 11 pages.
Bahl et al., "Large Vocabulary Natural Language Continuous Speech Recognition", In Proceedings of 1989 International Conference on Acoustics, Speech, and Signal Processing, vol. 1, May 23-26, 1989, 6 pages.
Notice of Allowance received for U.S. Appl. No. 12/244,713, dated Aug. 7, 2012, 7 pages.
Notice of Allowance received for U.S. Appl. No. 12/244,713, dated May 10, 2012, 5 pages.
Final Office Action received for U.S. Appl. No. 13/053,144, dated Nov. 19, 2013, 24 pages.
Non Final Office Action received for U.S. Appl. No. 13/053,144, dated Mar. 22, 2013, 18 pages.
Notice of Allowance received for U.S. Appl. No. 13/480,422, dated Jul. 19, 2012, 9 pages.
Supplemental Notice of Allowance received for U.S. Appl. No. 13/480,422, dated Sep. 27, 2012, 2 pages.
Notice of Allowance received for U.S. Appl. No. 13/604,556, dated Apr. 1, 2013, 9 pages.
Notice of Allowance received for U.S. Appl. No. 13/604,556, dated Jul. 31, 2013, 9 pages.
Acero et al., "Environmental Robustness in Automatic Speech Recognition", International Conference on Acoustics, Speech, and Signal Processing (ICASSP'90), Apr. 3-6, 1990, 4 pages.
Acero et al., "Robust Speech Recognition by Normalization of The Acoustic Space", International Conference on Acoustics, Speech, and Signal Processing, 1991, 4 pages.
Agnes et al., "Spoken Language Translator: First-Year Report", SICS Research Report, Jan. 1994, 161 pages.
Ahlborn et al., "Modeling Spectral Speech Transitions Using Temporal Decomposition Techniques", IEEE International Conference of Acoustics, Speech, and Signal Processing (ICASSP'87), vol. 12, Apr. 1987, 4 pages.
Aikawa et al., "Speech Recognition Using Time-Warping Neural Networks", Proceedings of the 1991 IEEE Workshop on Neural Networks for Signal Processing, Sep. 30 to Oct. 1, 1991, 10 pages.
Alfred App, available online at <http://www.alfredapp.com/>, retrieved on Feb. 8, 2012, 5 pages.
Allen, James, "Natural Language Understanding", 2nd Edition, 1995, 671 pages.
Alshawi et al., "CLARE: A Contextual Reasoning and Cooperative Response Framework for the Core Language Engine—Final Report", SRI International, available online at <http://www.cam.sri.com/tr/crc028/paper.ps.Z>, Dec. 1992, pp. 1-272.
Alshawi et al., "Declarative Derivation of Database Queries from Meaning Representations", Proceedings of the BANKAI Workshop, Oct. 1991, pp. 1-12.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Sep. 1988, pp. 1-13.
Alshawi, Hiyan, "Translation and Monotonic Interpretation/Generation", SRI International, available online at <http://www.cam.sri.com/tr/crc024/paper.ps.Z>, Jul. 1992, pp. 1-18.
Ambite et al., Design and Implementation of the CALO Query Manager, American Association for Artificial Intelligence, 2006, 8 pages.
Ambite et al., "Integration of Heterogeneous Knowledge Sources in the CALO Query Manager", The 4th International Conference on Ontologies, DataBases, and Applications of Semantics (ODBASE), 2005, 18 pages.
Anastasakos et al., "Duration Modeling in Large Vocabulary Speech Recognition", International Conference on Acoustics, Speech, and Signal Processing (ICASSP'95), May 9-12, 1995, 4 pages.
Anderson et al., "Syntax-Directed Recognition of Hand-Printed Two-Dimensional Mathematics", In Proceedings of Symposium on Interactive Systems for Experimental Applied Mathematics: Proceedings of the Association for Computing Machinery Inc. Symposium, 1967, 12 pages.
Anonymous, "Speaker Recognition", Wikipedia, The Free Enclyclopedia, Nov. 2, 2010, 3 pages.
Ansari et al., "Pitch Modification of Speech using a Low-Sensitivity Inverse Filter Approach", IEEE Signal Processing Letters, vol. 5, No. 3, Mar. 1998, 3 pages.
Anthony et al., "Supervised Adaption for Signature Verification System", IBM Technical Disclosure, Jun. 1, 1978, 3 pages.
Appelt et al., "Fastus: A Finite-state Processor for Information Extraction from Real-world Text", Proceedings of IJCAI, 1993, 8 pages.
Appelt et al., "SRI International Fastus System MUC-6 Test Results and Analysis", SRI International, 1995, 12 pages.
Appelt et al., "SRI: Description of the JV-FASTUS System Used for MUC-5", SRI International, 1993, pp. 1-19.
Apple Computer, "Guide Maker User's Guide", © Apple Computer, Inc., Apr. 27, 1994, 8 pages.
Apple Computer, "Introduction to Apple Guide", © Apple Computer, Inc., Apr. 28, 1994, 20 pages.
Archbold et al., "A Team User's Guide", SRI International, Technical Note 254, Dec. 21, 1981, 70 pages.
Asanovic et al., "Experimental Determination of Precision Requirements for Back-Propagation Training of Artificial Neural Networks", In Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech, and Signal Processing (ICASSP'83), Apr. 1983, 4 pages.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No., Jul. 1989, 8 pages.
Bahl et al., "Acoustic Markov Models Used in the Tangora Speech Recognition System", In Proceeding of International Conference on Acoustics, Speech, and Signal Processing (ICASSP'88), vol. 1, Apr. 11-14, 1988, 4 pages.
Bulyko et al., "Error-Correction Detection and Response Generation in a Spoken Dialogue System", Speech Communication, vol. 45, 2005, pp. 271-288.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", In Proceeding of International Conference on Acoustics, Speech, and Signal Processing (ICASSP'88), vol. 1, Apr. 11-14, 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Technical Note 522, Feb. 22, 1993, pp. 1-8.
Bear et al., "Detection and Correction of Repairs in Human-Computer Dialog", SRI International, Technical Note 518, May 5, 1992, pp. 1-10.
Bear et al., "Integrating Multiple Knowledge Sources for Detection and Correction of Repairs in Human-Computer Dialog", Proceedings of the 30th annual meeting on Association for Computational Linguistics (ACL), 1992, 8 pages.
Bear et al., "Using Information Extraction to Improve Document Retrieval", SRI International, Jan. 9, 1998, pp. 1-11.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.

(56) References Cited

OTHER PUBLICATIONS

Bellegarda et al., "A Latent Semantic Analysis Framework for Large-Span Language Modeling", 5th European Conference on Speech, Communication and Technology, (EUROSPEECH'97), Sep. 22-25, 1997, 4 pages.
Bellegarda et al., "A Multispan Language Modeling Framework for Large Vocabulary Speech Recognition", IEEE Transactions on Speech and Audio Processing vol. 6, No. 5, Sep. 1998, 12 pages.
Bellegarda et al., "A Novel Word Clustering Algorithm Based on Latent Semantic Analysis", In Proceedings of the IEEE International Conference on Acoustics, Speech, and Signal Processing (ICASSP'96}, vol. 1, 1996, 4 pages.
Bellegarda et al., "Experiments Using Data Augmentation for Speaker Adaptation", International Conference on Acoustics, Speech, and Signal Processing (ICASSP'95), May 9-12, 1995, 4 pages.
Bellegarda et al., "On-Line Handwriting Recognition Using Statistical Mixtures", Advances in Handwriting and Drawings: A Multidisciplinary Approach, Europia, 6th International IGS Conference on Handwriting and Drawing, Paris-France, Jul. 1993, 11 pages.
Bellegarda et al., "Performance of the IBM Large Vocabulary Continuous Speech Recognition System on the ARPA Wall Street Journal Task", Signal Processing VII: Theories and Applications, © 1994 European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda, J. R., "Exploiting Both Local and Global Constraints for Multi-Span Statistical Language Modeling", Proceeding of the 1998 IEEE International Conference on Acoustics, Speech, and Signal Processing (1CASSP'98), vol. 2, May 12-15, 1998, 5 pages.
Bellegarda, J. R., "Exploiting Latent Semantic Information in Statistical Language Modeling", Proceedings of the IEEE, vol. 88, No. 8, Aug. 2000, 18 pages.
Bellegarda, J. R., "Interaction-Driven Speech Input—A Data-Driven Approach to the Capture of Both Local and Global Language Constraints", available online at <http:// old.sig.chi.ora/bulletin/1998.2/bellegarda.html>, 1992, 7 pages.
Bellegarda, J. R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", In Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Black et al., "Automatically Clustering Similar Units for Unit Selection in Speech Synthesis", In Proceedings of Eurospeech 1997, vol. 2, 1997, 4 pages.
Blair et al., "An Evaluation of Retrieval Effectiveness for a Full-Text Document-Retrieval System", Communications of the ACM, vol. 28, No. 3, Mar. 1985, 11 pages.
Bobrow et al., "Knowledge Representation for Syntactic/Semantic Processing", AAA-80 Proceedings, 1980, pp. 316-323.
Bouchou et al., "Using Transducers in Natural Language Database Query", Proceedings of 4th International Conference on Applications of Natural Language to Information Systems, Austria, Jun. 17-19, 1999, 17 pages.
Bratt et al., "The SRI Telephone-based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Bulyko et al., "Joint Prosody Prediction and Unit Selection for Concatenative Speech Synthesis", Electrical Engineering Department, University of Washington, Seattle, 2001, 4 pages.
Burke et al., "Question Answering from Frequently Asked Question Files", AI Magazine, Spring, vol. 18, No. 2, 1997, pp. 57-66.
Burns et al., "Development of a Web-Based Intelligent Agent for the Fashion Selection and Purchasing Process via Electronic Commerce", Proceedings of the Americas Conference on Information system (AMCIS), Dec. 31, 1998, pp. 140-142.
Bussey et al., "Service Architecture, Prototype Description, and Network Implications of a Personalized Information Grazing Service", INFOCOM'90, Ninth Annual Joint Conference of the IEEE Computer and Communication Societies, available online at <http://slrohall.com/oublications/>, Jun. 3-7, 1990, 8 pages.
Bussler et al., "Web Service Execution Environment (WSMX)", available online at <http://www.w3.org/Submission/WSMX/>, retrieved from internet on Sep. 17, 2012, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech, and Signal Processing, vol. Assp-28, No. 5, Oct. 1980, 13 pages.
Caminero-Gil et al., "Data-Driven Discourse Modeling for Semantic Interpretation", In Proceedings of the IEEE International Conference on Acoustics, Speech, and Signal Processing, May 7-10, 1996, 6 pages.
Carter et al., "The Speech-Language Interface in the Spoken Language Translator", SRI International, Nov. 23, 1994, pp. 1-9.
Carter, David M., "Lexical Acquisition in the Core Language Engine", Proceedings of the Fourth Conference of the European Chapter of the Association for Computational Linguistics, 1989, pp. 137-144.
Cawley, "The Application of Neural Networks to Phonetic Modelling", PhD Thesis, University of Essex, Mar. 1996, 13 pages.
Chai et al., "Comparative Evaluation of a Natural Language Dialog Based System and a Menu Driven System for Information Access: a Case Study", Proceedings of the International Conference on Multimedia Information Retrieval (RIAO), Apr. 2000, 11 pages.
Chang et al., "A Segment-based Speech Recognition System for Isolated Mandarin Syllables", Proceedings TEN CON '93, IEEE Region 10 conference on Computer, Communication, Control and Power Engineering, vol. 3, Oct. 19-21, 1993, pp. 317-320.
Chen, Yi, "Multimedia Siri Finds and Plays Whatever You Ask for", PSFK Report, Feb. 9, 2012, 9 pages.
Cheyer et al., "Multimodal Maps: An Agent-based Approach", International Conference on Cooperative Multimodal Communication, Jun. 9, 1995, pp. 1-15.
Cheyer et al., "Spoken Language and Multimodal Applications for Electronic Realties", Virtual Reality, vol. 3, 1999, pp. 1-15.
Cheyer et al., "The Open Agent Architecture,", Autonomous Agents and Multi-Agent systems, vol. 4, Mar. 1, 2001, 6 pages.
Cheyer et al., "The Open Agent Architecture: Building Communities of Distributed Software Agents", Artificial Intelligence Center SRI International, Power Point presentation, available online at <http://www.ai.sri.com/~oaa>, Feb. 21, 1998, 25 pages.
Cheyer, Adam, "A Perspective on AI & Agent Technologies for SCM", VerticaiNet presentation, 2001, 22 pages.

\* cited by examiner

VOICE ACTIVATED DEVICE FOR USE WITH A VOICE-BASED DIGITAL ASSISTANT

CROSS-REFERENCE TO RELATED APPLICATIONS

This application claims the benefit of U.S. Provisional Application No. 61/799,722, filed on Mar. 15, 2013, entitled VOICE ACTIVATED DEVICE FOR USE WITH A VOICE-BASED DIGITAL ASSISTANT, which is hereby incorporated by reference in its entity for all purposes.

TECHNICAL FIELD

The disclosed implementations relate generally to voice-based digital assistants. More specifically, it relates to a voice activated device for interacting with a voice-based digital assistant.

BACKGROUND

Recently, voice-based digital assistants have been introduced into the marketplace to handle various tasks such as web searching and navigation. One advantage of such voice-based digital assistants is that users can interact with a device in a hands-free manner without handling or even looking at the device. Hands-free operation can be particularly beneficial when a person cannot or should not physically handle a device, such as when they are cooking. Accordingly, it would be advantageous to provide a voice-activated device for interacting with a voice-based digital assistant (or other speech-based service).

SUMMARY

The implementations described below provide voice activated devices for interacting with a voice-based assistant. Interactions with a voice-based digital assistant (or other speech-based services, such as a speech-to-text transcription service) can be performed using only an audio interface on the user device. Thus, it is advantageous to limit the human-machine interface on the device to conserve power, reduce production costs, and/or reduce the size of the device. As described herein, a voice activated device with a human-machine interface consisting essentially of an audio interface can be used to interact with a speech-based service without requiring any physical interaction by the user. For example, a user is enabled to activate a digital assistant on the voice activated device by reciting the phrase "Hey, Assistant." In response, the voice activated device outputs a beep, sound, or speech output (e.g., "what can I do for you?") indicating to the user that the listening mode is active. Accordingly, the user can initiate an interaction with the voice-based digital assistant without having to physically touch the voice activated device.

One technique for initiating a speech-based service with a voice trigger is to have the speech-based service continuously listen for a predetermined trigger word, phrase, or sound (any of which may be referred to herein as "the trigger sound"). However, continuously operating the speech-based service (e.g., the voice-based digital assistant) requires substantial audio processing and battery power. In order to reduce the power consumed by providing voice trigger functionality, several techniques are, optionally, employed. In some implementations, the main processor of the voice activated device (e.g., an "application processor") is kept in a low-power or un-powered state while one or more sound detectors that use less power (e.g., because they do not rely on the application processor) remain active. (When it is in a low-power or un-powered state, an application processor or any other processor, program, or module may be described as being inactive or in a standby mode.) For example, a low-power sound detector is used to monitor an audio channel for a trigger sound even when the application processor is inactive. This sound detector is sometimes referred to herein as a trigger sound detector. In some implementations, the trigger sound detector is configured to detect particular sounds, phonemes, and/or words. The trigger sound detector (including hardware and/or software components) is designed to recognize specific words, sound, or phrases, but is generally not capable of or optimized for providing full speech-to-text functionality, as such tasks require greater computational and power resources. Thus, in some implementations, the trigger sound detector recognizes whether a voice input includes a predefined pattern (e.g., a sonic pattern matching the words "Hey, Assistant"), but is not able to (or is not configured to) convert the voice input into text or recognize a significant amount of other words. Once the trigger sound has been detected, then, the voice-based digital assistant is brought out of a standby mode so that the user can provide a voice command.

In some implementations, the trigger sound detector is configured to detect several different trigger sounds, such as a set of words, phrases, sounds, and/or combinations thereof. The user can then use any of those sounds to initiate the speech-based service. In one example, a voice trigger is preconfigured to respond to the phrases "Hey, Assistant," "Wake up, Assistant," "Invoke my digital assistant," or "Hello, HAL, do you read me, HAL?" In some implementations, the user must select one of the preconfigured trigger sounds as the sole trigger sound. In some implementations, the user selects a subset of the preconfigured trigger sounds, so that the user can initiate the speech-based service with different trigger sounds. In some implementations, all of the preconfigured trigger sounds remain valid trigger sounds.

In some implementations, another sound detector is used so that even the trigger sound detector can be kept in a low-power or no-power mode for much of the time. For example, a different type of sound detector (e.g., one that uses less power than the trigger sound detector) is used to monitor an audio channel to determine whether the sound input corresponds to a certain type of sound. Sounds are categorized as different "types" based on certain identifiable characteristics of the sounds. For example, sounds that are of the type "human voice" have certain spectral content, periodicity, fundamental frequencies, etc. Other types of sounds (e.g., whistles, hand claps, etc.) have different characteristics. Sounds of different types are identified using audio and/or signal processing techniques, as described herein.

This sound detector is sometimes referred to herein as a sound-type detector." For example, if a predetermined trigger phrase is "Hey, Assistant," the sound-type detector determines whether the input likely corresponds to human speech. If the trigger sound is a non-voiced sound, such as a whistle, the sound-type detector determines whether a sound input likely corresponds to a whistle. When the appropriate type of sound is detected, the sound-type detector initiates the trigger sound detector to further process and/or analyze the sound. And because the sound-type detector requires less power than the trigger sound detector (e.g., because it uses circuitry with lower power demands and/or more efficient audio processing algorithms than the trigger-sound detector), the voice trigger functionality consumes even less power than with a trigger sound detector alone.

In some implementations, yet another sound detector is used so that both the sound-type detector and the trigger sound detector described above can be kept in a low-power or no-power mode for much of the time. For example, a sound detector that uses less power than the sound-type detector is used to monitor an audio channel to determine whether a sound input satisfies a predetermined condition, such as an amplitude (e.g., volume) threshold. This sound detector may be referred to herein as a noise detector. When the noise detector detects a sound that satisfies the predetermined threshold, the noise detector initiates the sound-type detector to further process and/or analyze the sound. And because the noise detector requires less power than either the sound-type detector or the trigger sound detector (e.g., because it uses circuitry with lower power demands and/or more efficient audio processing algorithms), the voice trigger functionality consumes even less power than the combination of the sound-type detector and the trigger sound detector without the noise detector.

In some implementations, any one or more of the sound detectors described above are operated according to a duty cycle, where they are cycled between "on" and "off" states. This further helps to reduce power consumption of the voice trigger. For example, in some implementations, the noise detector is "on" (i.e., actively monitoring an audio channel) for 10 milliseconds, and "off" for the following 90 milliseconds. This way, the noise detector is "off" 90% of the time, while still providing effectively continuous noise detection functionality. In some implementations, the on and off durations for the sound detectors are selected so that all of the detectors are be activated while the trigger sound is still being input. For example, for a trigger phrase of "Hey, Assistant," the sound detectors are, optionally, configured so that no matter where in the duty cycle(s) the trigger phrase begins, the trigger sound detector is activated in time to analyze a sufficient amount of the input. For example, the trigger sound detector will be activated in time to receive, process, and analyze the sounds "ay Assistant," which is enough to determine that the sound matches the trigger phrase. In some implementations, sound inputs are stored in memory as they are received and passed to au upstream detector so that a larger portion of the sound input can be analyzed. Accordingly, even if the trigger sound detector is not initiated until after a trigger phrase has been uttered, it can still analyze the entire recorded trigger phrase.

Some implementations provide a voice activated device for interacting with a voice based digital assistant. The voice activated device includes a housing, one or more processors in the housing, memory in the housing, the memory coupled to the one or more processors and comprising instructions for automatically identifying and connecting to a digital assistant server without a user having to enter information about the server. The voice activated device also includes a power supply at least partially within the housing, a wireless network module at least partially within the housing, the wireless network module coupled to the one or more processors, and a human-machine interface. The human-machine interface consists essentially of at least one speaker at least partially within the housing, at least one microphone at least partially within the housing, an analog to digital converter coupled to the microphone and configured to convert speech into digital signals, a digital to analog converter coupled to the at least one speaker and configured to convert received data into audio signals, including speech, and zero or more additional components, coupled to the one or more processors, selected from the set consisting of: a touch-sensitive surface configured to receive touch inputs; one or more cameras; and one or more LEDs. The voice activated device is configured to act as an interface for speech communications between the user and a digital assistant of the user on the digital assistant server.

In some implementations, the touch-sensitive surface corresponds to the housing. In some implementations, the touch-sensitive surface corresponds to a portion of the housing. In some implementations, the touch-sensitive surface replaces a portion of the housing.

In some implementations, the wireless network module is configured to utilize any known wireless network protocol such as Bluetooth, Wi-Fi, voice over Internet Protocol (VoIP), infrared, or any other suitable communication protocol. In some implementations, the wireless network module is further configured to couple to one or more user devices.

In some implementations, the voice activated device is coupled with one or more additional instances of the voice activated device via a wireless network and the voice activated device shares information with the one or more additional instances of the voice activated device. In some implementations, the voice activated device is further configured to provide intercom communication between the one or more coupled devices.

In some implementations, the LEDs are configured to provide user feedback. In some implementations, the LEDs are configured to indicate the voice activated device's current state.

In some implementations, the voice activated device also includes one or more light sensors coupled to the one or more processors. In some implementations, the voice activated device also includes a motion sensor to detect motion in proximity to the voice activated device.

In some implementations, the voice activated device is further configured, while in a security mode, to: detect a change in light level above a predefined threshold with the one or more light sensors; in response to the change in light level, audibly request a passcode; in accordance with a determination that the passcode was received within a predetermined amount of time and that the received passcode matches a preset security code, disable the security mode; and in accordance with a determination that the passcode was not received within a predetermined amount of time or that the received passcode did not match the preset security code, activate an alarm routine.

In some implementations, the voice activated device is further configured, while in a security mode, to: detect movement with the motion sensor; in response to the detected movement, audibly request a passcode; in accordance with a determination that the passcode was received within a predetermined amount of time and that the received passcode matches a preset security code, disable the security mode; and in accordance with a determination that the passcode was not received within a predetermined amount of time or that the received passcode did not match the preset security code, activate an alarm routine.

In some implementations, the voice activated device also includes a fire detection module coupled to the one or more processors. In some implementations, the voice activated device also includes a carbon monoxide detection module coupled to the one or more processors.

In some implementations, the memory stores a personalized configuration for each of a plurality of users, and the voice activated device is further configured, when activated by a respective user, to provide services to the respective user utilizing the respective personalized configuration.

In some implementations, the voice activated device is further configured to play audio files associated with the user. In some implementations, the voice activated device is further configured for home automation. In some implementations, the voice activated device is further configured to function as a timer when prompted by the user. In some implementations, the voice activated device is further configured to access a news source and provide news to the user when prompted by the user. In some implementations, the voice activated device is further configured to store the converted user speech in memory when prompted by the user.

In some implementations, the voice activated device is further configured to provide text-to-speech (TTS) communication between the user and a second party. In some implementations, the voice activated device is coupled to a telephone associated with the user and the voice activated device is further configured to provide telecommunication via the telephone for the user. In some implementations, the voice activated device is further configured to provide notifications received from the one or more coupled devices to the user.

In some implementations, the voice activated device is further configured to access the user's calendar. In some of these implementations, the voice activated device is further configured to provide calendar reminders to the user. In some implementations, the voice activated device is further configured to update the user's calendar.

In some implementations, the voice activated device is further configured to access a set of instructions and output the instruction steps when prompted by the user.

In some implementations, the voice activated device is further configured to store in memory one or more macros provided by the user, where each macro is associated with a respective phrase. In some of these implementations, the voice activated device is further configured to play the macro associated with the respective phrase when the respective phrase is spoken by the user.

BRIEF DESCRIPTION OF THE DRAWINGS

Like reference numerals refer to corresponding parts throughout the drawings.

DESCRIPTION OF IMPLEMENTATIONS

Figure 1:
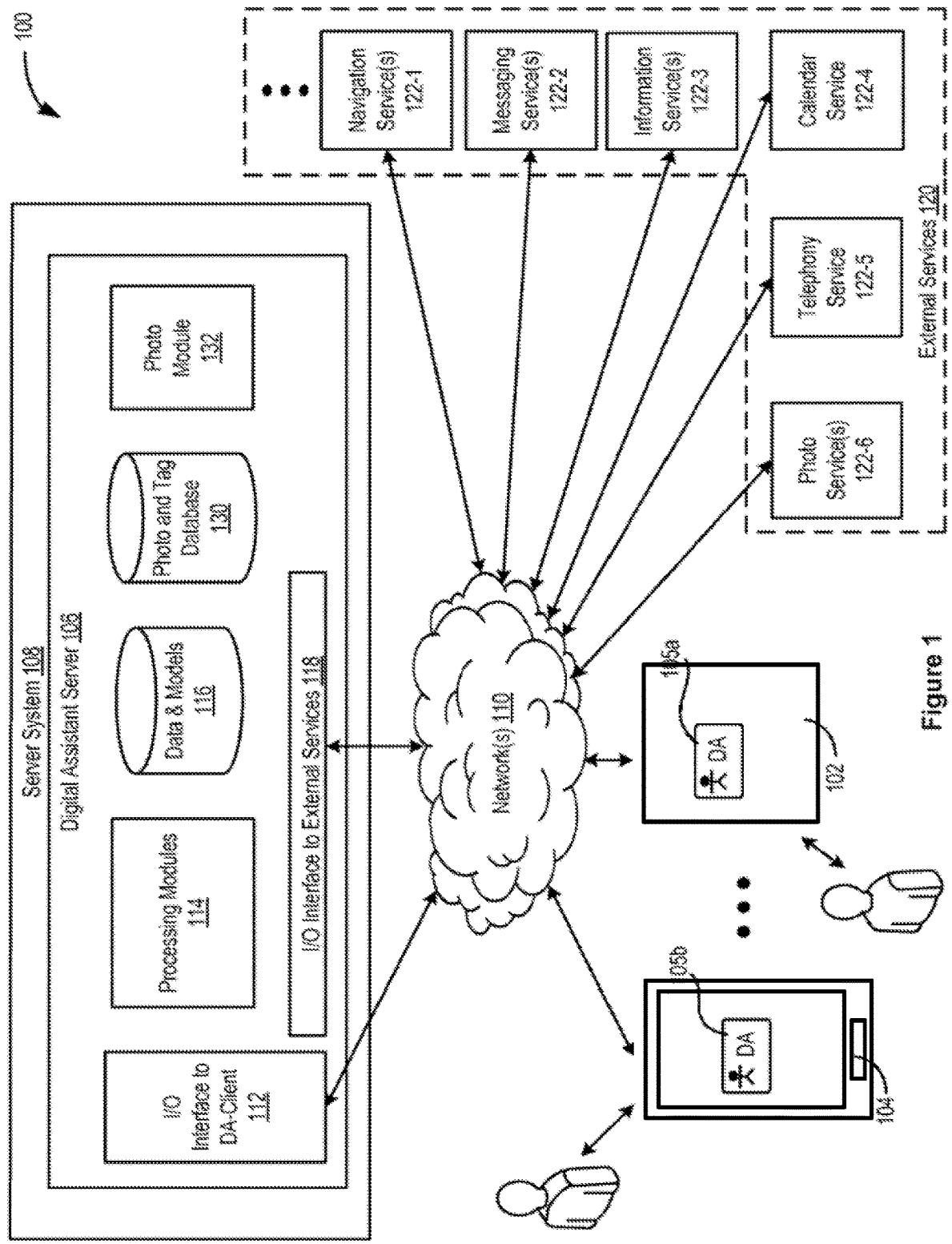
FIG. 1 is a block diagram illustrating an environment in which a digital assistant operates in accordance with some implementations.

FIG. 1 is a block diagram of an operating environment 100 of a digital assistant according to some implementations. The terms "digital assistant," "virtual assistant," "intelligent automated assistant," "voice-based digital assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, once initiated, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then send a suitable calendar invite from the user's email address to each of the user' friends listed in the user's electronic address book or contact list. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some implementations, a digital assistant system is implemented according to a client-server model. The digital assistant system includes a client-side portion (e.g., 105a and 105b) (hereafter "digital assistant (DA) client 105") executed on a user device (e.g., 104 and 102), and a server-side portion 106 (hereafter "digital assistant (DA) server 106") executed on a server system 108. The DA client 105 communicates with the DA server 106 through one or more networks 110. The DA client 105 provides client-side functionalities such as user input and output processing and communications with the DA server 106. The DA server 106 provides server-side functionalities for any number of DA clients 105 each residing on a respective user device (also called a client device or electronic device).

In some implementations, the DA server 106 includes a client-facing I/O interface 112, one or more processing modules 114, data and models 116, an I/O interface to external services 118, a photo and tag database 130, and a photo-tag module 132. The client-facing I/O interface facilitates the client-facing input and output processing for the digital assistant server 106. The one or more processing modules 114 utilize the data and models 116 to determine the user's intent based on natural language input and perform task execution based on the deduced user intent. Photo and tag database 130 stores fingerprints of digital photographs, and, optionally digital photographs themselves, as well as tags associated with the digital photographs. Photo-tag module 132 creates tags, stores tags in association with photographs and/or fingerprints, automatically tags photographs, and links tags to locations within photographs.

In some implementations, the DA server 106 communicates with external services 120 (e.g., navigation service(s) 122-1, messaging service(s) 122-2, information service(s) 122-3, calendar service 122-4, telephony service 122-5, photo service(s) 122-6, etc.) through the network(s) 110 for task completion or information acquisition. The I/O interface to the external services 118 facilitates such communications.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices.

Figure 2:
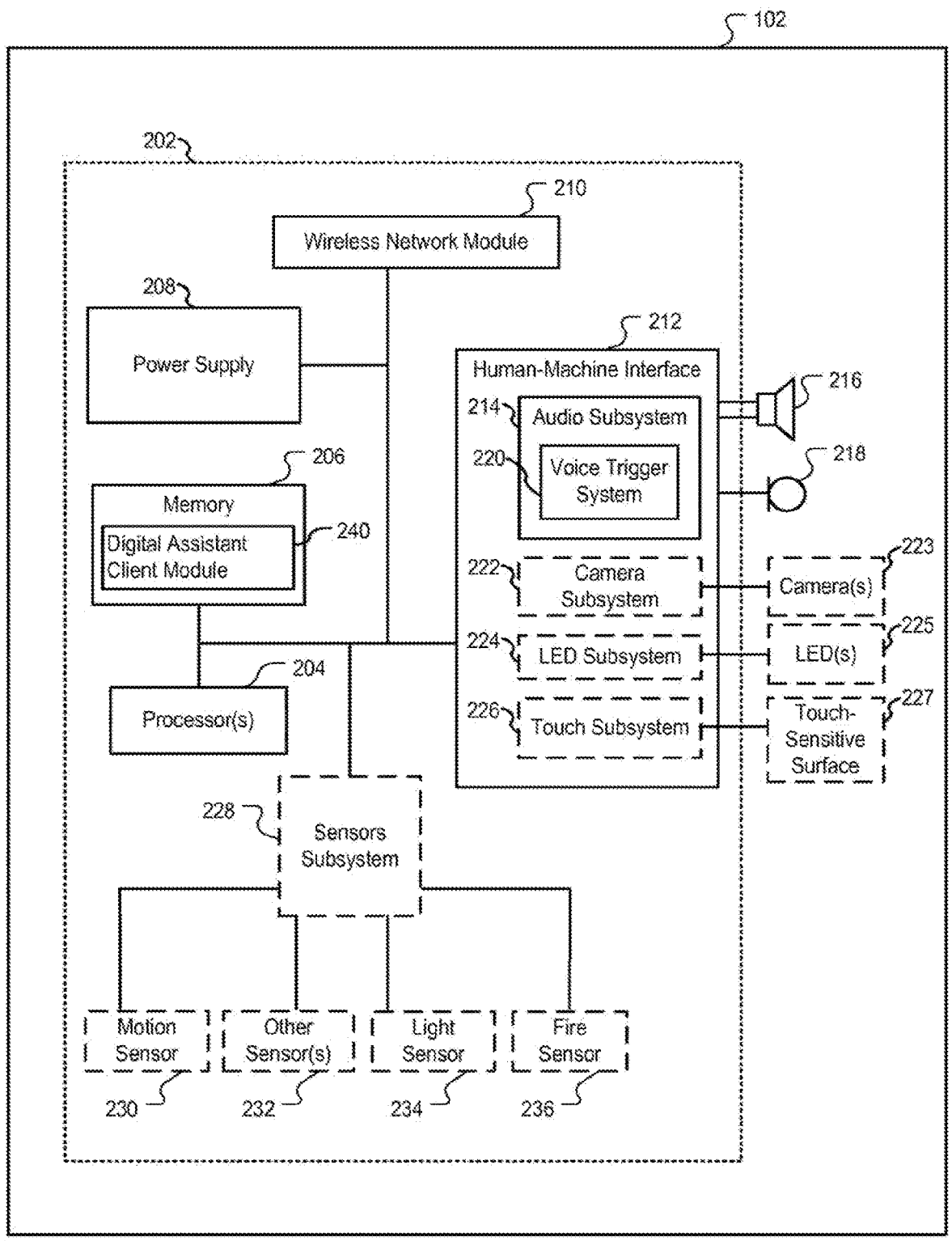
FIG. 2 is a block diagram illustrating a voice activated device in accordance with some implementations.

More details on a voice activated device are provided in reference to an exemplary voice activated device 102 shown in FIG. 2.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some implementations, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client-side portion (e.g., the DA client 105) and a server-side portion (e.g., the DA server 106), in some implementations, a digital assistant system refers only to the server-side portion (e.g., the DA server 106). In some implementations, the functions of a digital assistant can be implemented as a standalone application installed on a user device. In addition, the divisions of functionalities between the client and server portions of the digital assistant can vary in different implementations. For example, in some implementations, the DA client 105 is a thin-client that provides only user-facing input and output processing functions, and delegates all other functionalities of the digital assistant to the DA server 106. In some other implementations, the DA client 105 is configured to perform or assist one or more functions of the DA server 106.

FIG. 2 is a block diagram of a voice activated device in accordance with some implementations. Voice activated device 102 includes housing 202, one or more processors 204, memory 206, power supply 208, wireless network module 210, and human-machine interface 212. The various components in voice activated device 102 are coupled by one or more communication buses or signal lines. Voice activated device 102, optionally, includes sensors subsystem 228 and various sensors that are coupled to sensors subsystem 228. The sensors gather information and/or facilitate various functionalities of voice activated device 102. For example, in some implementations, a motion sensor 230, a light sensor 234, a fire sensor 236, and other sensors 232 including a GPS receiver, a temperature sensor, and a proximity sensor are coupled to the sensors subsystem 228 to facilitate light, location, safety, security, and proximity sensing functions. In some implementations, other sensors 232 include a biometric sensor, a barometer, and the like, and are connected to the sensors subsystem 228, to facilitate related functionalities.

In some implementations, human-machine interface 212 includes audio subsystem 214 coupled to one or more speakers 216 and one or more microphones 218. In some implementations, human-machine interface 212 includes camera subsystem 222 connected to one or more cameras 223. In some of these implementations, camera subsystem 222 facilitates security and communications functionalities (e.g., such as taking photographs and recording video clips). In some implementations, human-machine interface 212 includes LED subsystem 224 connected to one or more LEDs 225. In some of these implementations, LED subsystem 224 facilitates user feedback functionalities. In some implementations, human-machine interface 212 includes touch subsystem 226 connected to a touch-sensitive surface 227. In some of these implementations, touch subsystem 226 facilitates user input functionalities.

Wireless network module 210 optionally includes radio frequency receivers and transmitters and/or optical (e.g., infrared) receivers and transmitters. When voice activated device 102 includes touch subsystem 226 and the touch-sensitive surface 227, touch subsystem 226 and the touch-sensitive surface 227 are typically configured to, for example, detect contact and movement or break thereof using any of a plurality of touch sensitivity technologies, such as capacitive, resistive, infrared, surface acoustic wave technologies, proximity sensor arrays, and the like.

In some implementations, audio subsystem 214 is coupled to one or more speakers 216 and one or more microphones 218 to facilitate voice-enabled functions, such as voice recognition, voice replication, digital recording, and telephony functions. In some implementations, audio subsystem 214 includes voice trigger system 220. In some implementations, voice trigger system 220 and/or the audio subsystem 214 includes low-power audio circuitry and/or programs (e.g., including hardware and/or software) for receiving and/or analyzing sound inputs, including, for example, one or more analog-to-digital converters, digital signal processors (DSPs), sound detectors, memory buffers, codecs, and the like. In some implementations, the low-power audio circuitry (alone or in addition to other components of voice activated device 102) provides voice (or sound) trigger functionality for one or more aspects of voice activated device 102, such as a voice-based digital assistant or other speech-based service. In some implementations, the low-power audio circuitry provides voice trigger functionality even when other components of voice activated device 102 are shut down and/or in a standby mode, such as the processor(s) 204, memory 206, and the like. Voice trigger system 220 is described in further detail with respect to FIG. 4.

In some implementations, memory 206 includes a non-transitory computer readable storage medium, such as high-speed random access memory and/or non-volatile memory (e.g., one or more magnetic disk storage devices, one or more flash memory devices, one or more optical storage devices, and/or other non-volatile solid-state memory devices).

In some implementations, memory 206 stores an operating system, a communications module, a sensor processing module, and applications, and a subset or superset thereof. The operating system includes instructions for handling basic system services and for performing hardware dependent tasks. The communications module facilitates communicating with one or more additional devices, one or more computers and/or one or more servers. The sensor processing module facilitates sensor-related processing and functions (e.g., processing voice input received with the one or more microphones 218). The application module facilitates various functionalities of user applications, such as electronic-messaging, web browsing, media processing, and/or other processes and functions. In some implementations, voice activated device 102 stores in memory 206 one or more software applications each associated with at least one of the external service providers.

As described above, in some implementations, memory 206 also stores client-side digital assistant instructions (e.g., in a digital assistant client module 240) and various user data (e.g., user-specific vocabulary data, preference data, and/or other data such as the user's electronic address book or contact list, to-do lists, shopping lists, etc.) to provide the client-side functionalities of the digital assistant.

In various implementations, digital assistant client module 240 is capable of accepting voice input, touch input, and/or visual input through human-machine interface 212 of voice activated device 102. Digital assistant client module 240 is also capable of providing output in audio and visual forms. For example, output can be provided as voice, sound, alerts, and/or combinations of two or more of the above. During operation, digital assistant client module 240 optionally communicates with the digital assistant server (e.g., the digital assistant server 106, FIG. 1) using wireless network module 210. In some implementations, digital assistant client module 240 corresponds to DA client 105 (e.g., FIG. 1).

In some implementations, the digital assistant client module 240 utilizes various sensors and subsystems to gather additional information from the surrounding environment of voice activated device 102 to establish a context associated with a user input. In some implementations, the digital assistant client module 240 provides the context information or a subset thereof with the user input to the digital assistant server (e.g., the digital assistant server 106, FIG. 1) to help deduce the user's intent.

In some implementations, the context information that can accompany the user input includes sensor information, e.g., lighting, ambient noise, ambient temperature, images or videos of the surrounding environment, etc. In some implementations, the context information also includes the physical state of the voice activated device, e.g., device orientation, device location, device temperature, power level, speed, wireless signals strength, etc. In some implementations, information related to the software state of voice activated device 102, e.g., running processes, installed programs, past and present network activities, background services, error logs, resources usage, etc., of voice activated device 102 is also provided to the digital assistant server (e.g., the digital assistant server 106, FIG. 1) as context information associated with a user input.

In some implementations, the DA client module 240 selectively provides information (e.g., at least a portion of the user data) stored on voice activated device 102 in response to requests from the digital assistant server. In some implementations, the digital assistant client module 240 also elicits additional input from the user via a natural language dialogue upon request by the digital assistant server 106 (FIG. 1). The digital assistant client module 240 passes the additional input to the digital assistant server 106 to help the digital assistant server 106 in intent deduction and/or fulfillment of the user's intent expressed in the user request.

In some implementations, memory 206 includes additional instructions or fewer instructions. Furthermore, various functions of the voice activated device 102 are, optionally, implemented in hardware and/or in firmware, including in one or more signal processing and/or application specific integrated circuits. Thus, in some implementations, the voice activated device 102 includes fewer modules and/or applications than those illustrated in FIG. 2.

In some embodiments, voice activated device 102 does not include any physical ports (e.g., all communication between voice activated device 102 and external networks occurs via wireless communications, including communications related to software updates, communications related to performing voice commands received from a user, communications to and from other user devices, and the like). In embodiments, where the voice activated device does not include any physical ports, the lack of physical ports improves the appearance and functionality of the voice activated device, by making the voice activated device less susceptible to physical damage and allowing for a more symmetrical and visually pleasing appearance. Additionally, having fewer components reduces the manufacturing cost and the price of voice activated device 102.

Some embodiments provide a voice activated device (e.g., device 102) for interacting with a voice based digital assistant. The voice activated device includes a housing (e.g., housing 202), one or more processors (e.g., processor(s) 204) in the housing, memory (e.g., memory 206) in the housing, the memory coupled to the one or more processors and comprising instructions for automatically identifying and connecting to a digital assistant server without a user having to enter information about (e.g., an internet address for) the server.

The voice activated device also includes a power supply (e.g., a transformer or a battery such as power supply 208) at least partially within the housing (e.g., with a fold-out plug), a wireless network module (e.g., wireless network module 210) at least partially within the housing, the wireless network module coupled to the one or more processors, and a human-machine interface (e.g., human machine interface 212). In some implementations, the wireless network module is configured to utilize any known wireless network protocol such as Bluetooth, WiFi, voice over Internet Protocol (VoIP), infrared, or any other suitable communication protocol.

The human-machine interface consists essentially of at least one speaker (e.g., speaker 216) at least partially within the housing, at least one microphone (e.g., microphone 218) at least partially within the housing, an analog to digital converter (e.g., ADC 410 in audio subsystem 214, as described below with reference to FIG. 4) coupled to the microphone and configured to convert speech into digital signals, a digital to analog converter (e.g., DAC 412 in audio subsystem 214, as described below with reference to FIG. 4) coupled to the at least one speaker and configured to convert received data into audio signals, including speech, and zero or more additional components, coupled to the one or more processors, selected from the set consisting of: a touch-sensitive surface (e.g., touch-sensitive surface 227) configured to receive touch inputs; one or more cameras (e.g., camera(s) 223); and one or more LEDs (e.g., LED(s) 225). In some implementations, the analog to digital converter corresponds to a codec. In some implementations, the digital to analog converter corresponds to a codec. In some implementations, the codec is configured to utilize a user-specific adaptive speech recognition model. For example, requiring user to enter a training mode to update the model, or receiving the adaptive model from the digital assistant server (e.g., digital assistant server 106). In some implementations, the touch-sensitive surface is integrated into a portion of the housing (e.g., the user makes contact with the portion of the housing to provide input to the voice activated device). In some implementations, the touch-sensitive surface replaces part of the housing. In some implementations, the touch-sensitive surface is used to toggle sleep mode on the voice activated device. In some implementations, the touch-sensitive surface is used as an alternative input option for a user input request (e.g., to answer a yes/no query). In some implementations, the one or more cameras are configured to ID the user. In some implementations, the one or more cameras are configured to take pictures and/or video when requested by the user. In some implementations, the one or more cameras are configured to detect the environment around the voice activated device. In some implementations, the LEDs are configured to provide user feedback. In some implementations, the LEDs are configured to indicate the voice activated device's current state.

In some embodiments, the voice activated device is configured to act as an interface for speech communications between the user and a digital assistant of the user on the digital assistant server.

In some embodiments, the voice activated device is coupled with one or more additional instances of the voice activated device via a wireless network and the voice activated device shares information with the one or more additional instances of the voice activated device. For example, voice activated devices in different rooms of a house are coupled together and function as a single voice activated device when interacting with a user (e.g., the voice activated devices collaborate on assisting the user).

In some embodiments, the voice activated device is further configured to provide intercom communication between the one or more coupled devices. For example, when prompted by a user, a voice activated device in a kitchen of a house acts as an intercom with a voice activated device in a bedroom of the house.

In some embodiments, the voice activated device also includes one or more light sensors coupled to the one or more processors. In some implementations, the light sensors are configured to assist the voice activated device in detecting nearby activity. In some implementations, the voice activated device is further configured to utilize the light sensors when determining the appropriate operating mode (e.g., when to enter sleep mode).

In some embodiments, the voice activated device also includes a motion sensor to detect motion in proximity to the voice activated device.

In some embodiments, the voice activated device also includes a fire detection module (e.g., a smoke detector) coupled to the one or more processors. In some embodiments, the voice activated device also includes a carbon monoxide detection module coupled to the one or more processors.

In some embodiments, the memory stores a personalized configuration (e.g., user specific settings files) for each of a plurality of users, and the voice activated device is further configured, when activated by a respective user, to provide services to the respective user utilizing the respective personalized configuration. In some implementations, activating the voice activated device includes logging into the voice activated device. In some implementations, activating the voice activated device includes identifying the respective user by using a voice recognition model corresponding to the respective user.

In some embodiments, the voice activated device is further configured to play audio files (e.g., music files) associated with the user. In some implementations, the audio files are stored in memory on the voice activated device. In some implementations, the audio files are stored in memory on a server (e.g., digital assistant server 106, a remote media server, or a network attached storage system), distinct from the voice activated device. In some implementations, the audio files are streamed from a remote server (e.g., a radio station).

In some embodiments, the voice activated device is further configured for home automation. For example, in some implementations, the voice activated device is configured to control room lights, house lights, room temperature, various electronics (e.g., a television) and various kitchen appliances (e.g., a coffee maker).

In some embodiments, the voice activated device is further configured to function as a timer when prompted by the user. For example, in some implementations, the voice activated device is used as a cooking timer and/or an exercise timer.

In some embodiments, the voice activated device is further configured to access (e.g., via the wireless network module) a news source (e.g., the associated press or user preferred news site) and provide news to the user when prompted by the user. For example, in some implementations, the voice activated device provides weather information, stock information, sports scores, and/or headlines.

In some embodiments, the voice activated device is further configured to store the converted user speech in memory when prompted by the user. For example, in some implementations, take notes while the user dictates information (e.g., a speech or a paper).

In some embodiments, the wireless network module is further configured to couple to one or more user devices. For example, user devices include cellular phones, tablet computers, laptop computers, desktop computers, televisions, cable boxes, and the like.

In some embodiments, the voice activated device is further configured to provide text-to-speech (TTS) communication between the user and a second party. For example, in some implementations, the voice activated device receives a text message via a wireless network, converts the text message to a corresponding audio signal, and outputs (e.g., via speaker 216 in FIG. 2) the audio signal to the user.

In some embodiments, the voice activated device is further configured to provide speech-to-text communication between the user and a second party. For example, in some implementations, the voice activated device receives user speech (e.g., via microphone 218 in FIG. 2), converts the speech to a text message, and sends the text message to a second device designated by the user (e.g., via wireless network module 210 in FIG. 2).

In some embodiments, the voice activated device is coupled to a telephone associated with the user and the voice activated device is further configured to provide telecommunication via the telephone for the user. For example, in some implementations, the voice activated device is configured to function similar to a wireless headset (e.g., receiving voice inputs via microphone 218 and providing audible outputs via speaker 216).

In some embodiments, the voice activated device is further configured to provide notifications received from the one or more coupled devices to the user. In some implementations, the voice activated device receives a low battery warning from a coupled device (e.g., a cellphone or a laptop computer). In some of these implementations, the voice activated device audibly provides the warning to the user. In some implementations, the voice activated device receives an event notification (e.g., a voice message, text message, and/or calendar event) from a coupled device. In some of these implementations, the voice activated device audibly provides the event notification to the user.

In some embodiments, the voice activated device is further configured to access the user's calendar. In some implementations, the user's calendar is stored in memory on the voice activated device. In some implementations, the user's calendar is stored on a device (e.g., digital assistant server 106, a remote media server, a network attached storage system, or a user's phone or personal computer) that is remote from the voice activated device and is accessed via the wireless network module. In some implementations, the user's calendar is stored on the digital assistant server.

In some embodiments, the voice activated device is further configured to provide calendar reminders to the user. In some implementations, the voice activated device provides reminders when prompted by the user. In some implementations, the voice activated device provides reminders at a preset time before (e.g., a reminder 30 minutes for a meeting) and/or after the event occurs.

In some embodiments, the voice activated device is further configured to update the user's calendar. In some implementations, the voice activated device adds a calendar event after making an appointment (e.g., a doctor's appointment, a restaurant reservation, and the like) for the user. In some implementations, the voice activated device adds a calendar event when prompted by the user.

In some embodiments, the voice activated device is further configured to access a set of instructions and output the instruction steps when prompted by the user. For example, the voice activated device accesses a cooking recipe and recites the recipe steps as requested by the user. In some implementations, the voice activated device accesses the instructions from memory in the voice activated device. In some implementations, the voice activated device accesses the instructions from a coupled device (e.g., a user's phone, personal computer or network attached storage). In some implementations, the voice activated device accesses the instructions from the digital assistant server. In some implementations the voice activated device outputs all of the instruction steps when prompted. In some implementations the voice activated device outputs one instruction step when prompted and outputs each instruction step in sequence over successive prompts.

In some embodiments, the voice activated device is further configured to store in memory one or more macros provided by the user, where each macro is associated with a respective phrase (e.g., a trigger word or "Magic Word"). In some of these embodiments, the voice activated device is further configured to play the macro associated with the respective phrase when the respective phrase is spoken by the user. In some implementations, the memory is memory within the voice activated device (e.g., memory 206 in FIG. 2). In some implementations, the memory is memory on the digital assistant server (e.g., memory 302 in FIG. 3A). For example, the phrase "Good Morning Assistant" is, optionally, associated with a macro for the user's morning routine (e.g., provides news, turns on coffee maker, and checks weather). In some implementations, the phrase "Goodbye now Assistant" is, optionally, associated with a macro for turning off the house lights and entering security mode.

Figure 3A:
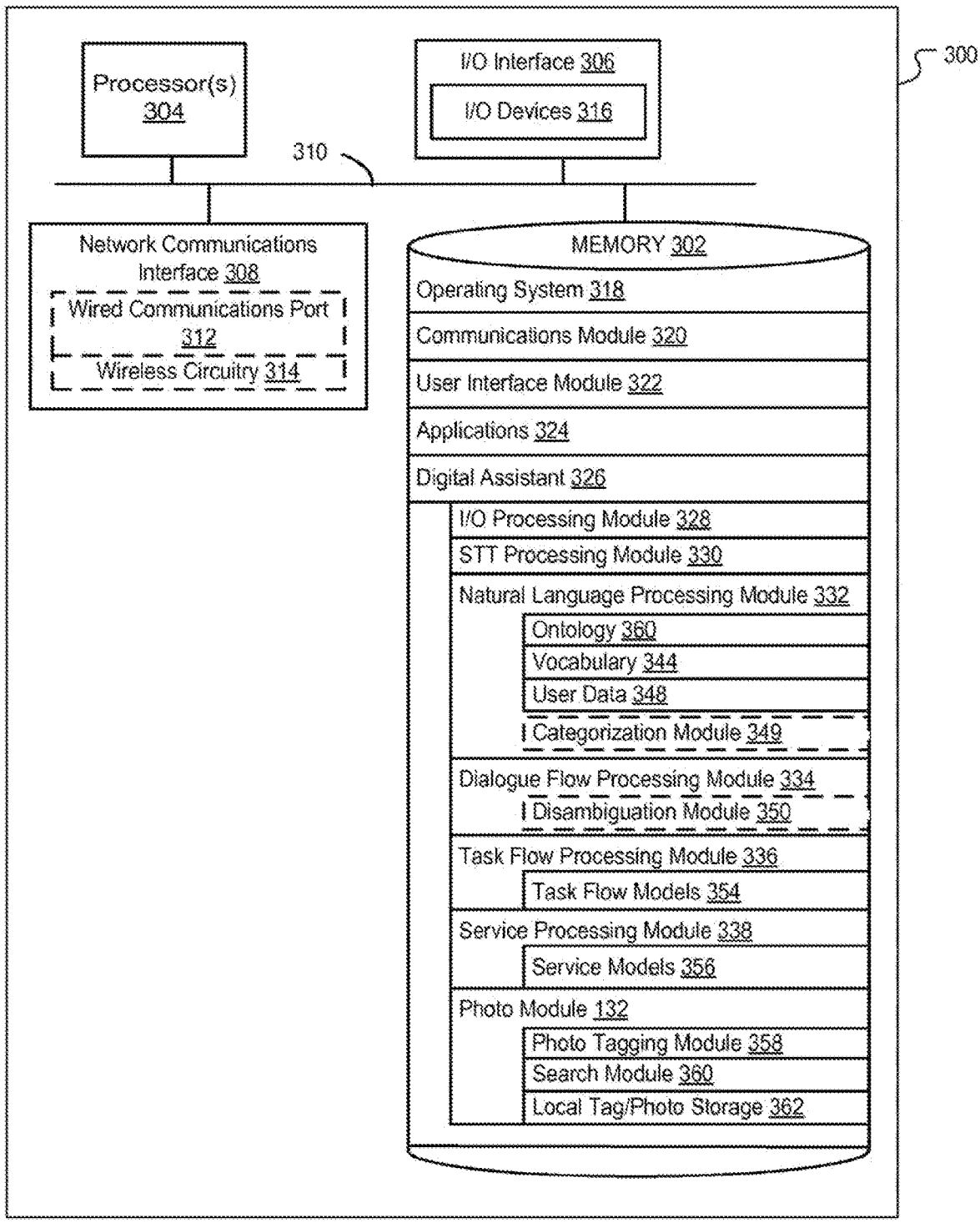
FIG. 3A is a block diagram illustrating a standalone digital assistant system or a digital assistant server system in accordance with some implementations.

FIG. 3A is a block diagram of an exemplary digital assistant system 300 (also referred to as the digital assistant) in accordance with some implementations. In some implementations, the digital assistant system 300 is implemented on a standalone computer system. In some implementations, the digital assistant system 300 is distributed across multiple computers. In some implementations, some of the modules and functions of the digital assistant are divided into a server portion and a client portion, where the client portion resides on a user device (e.g., voice activated device 102) and communicates with the server portion (e.g., the server system 108) through one or more networks, e.g., as shown in FIG. 1. In some implementations, the digital assistant system 300 is an embodiment of the server system 108 (and/or the digital assistant server 106) shown in FIG. 1. In some implementations, the digital assistant system 300 is implemented in a user device (e.g., the voice activated device 102, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some implementations, memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some implementations, when the digital assistant is implemented on a standalone user device, the digital assistant system 300 includes any of the components and I/O and communication interfaces described with respect to the voice activated device 102 in FIG. 2 (e.g., one or more microphones 216). In some implementations, the digital assistant system 300 represents the server portion of a digital assistant implementation, and interacts with the user through a client-side portion residing on a user device (e.g., the voice activated device 102 shown in FIG. 2).

In some implementations, the network communications interface 308 eludes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some implementations, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module of the voice activated device 102 shown in FIG. 2. The communications module 320 also includes various software components for handling data received by the wireless circuitry 314 and/or wired communications port 312.

In some implementations, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

Memory 302 also stores the digital assistant module (or the server portion of a digital assistant) 326. In some implementations, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a photo module 132. Each of these processing modules has access to one or more of the following data and models of the digital assistant 326, or a subset or superset thereof: ontology 360, vocabulary index 344, user data 348, categorization module 349, disambiguation module 350, task flow models 354, service models 356, photo tagging module 358, search module 360, and local tag/photo storage 362.

In some implementations, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some implementations, the digital assistant also takes appropriate actions when a satisfactory response was not or could not be provided to the user for various reasons.

In some implementations, as discussed below, the digital assistant system 300 identifies, from a natural language input, a user's intent to tag a digital photograph, and processes the natural language input so as to tag the digital photograph with appropriate information. In some implementations, the digital assistant system 300 performs other tasks related to photographs as well, such as searching for digital photographs using natural language input, auto-tagging photographs, and the like.

Figure 3B:
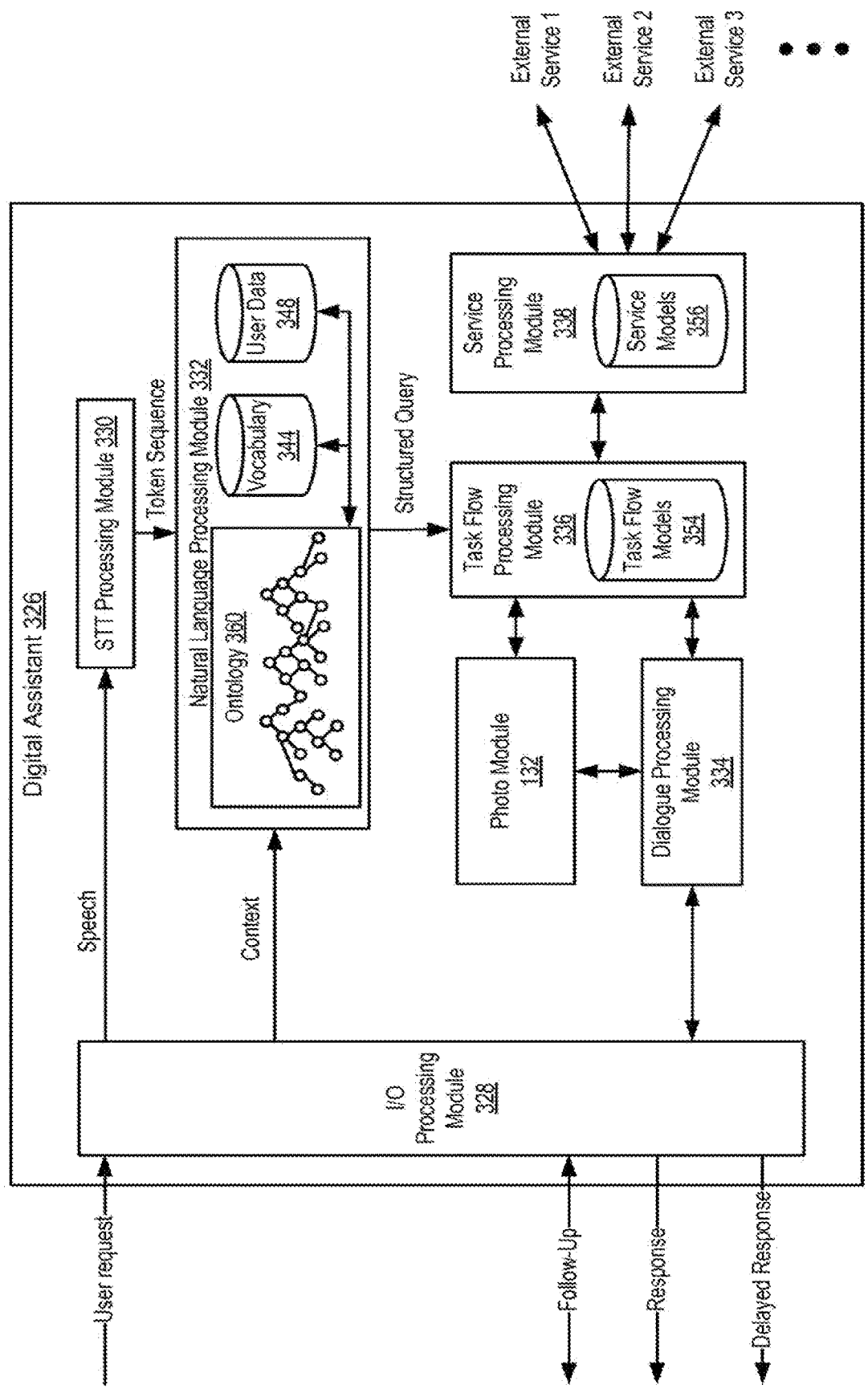
FIG. 3B is a block diagram illustrating functions of the digital assistant shown in FIG. 3A in accordance with some implementations.

As shown in FIG. 3B, in some implementations, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some implementations, the context information also includes software and hardware states of the voice activated device (e.g., voice activated device 102 in FIG. 1) at the time the user request is received, and/or information related to the surrounding environment of the user at the time that the user request was received. In some implementations, the I/O processing module 328 also sends follow-up questions to, and receives answers from, the user regarding the user request. In some implementations, when a user request is received by the I/O processing module 328 and the user request contains a speech input, the I/O processing module 328 forwards the speech input to the speech-to-text (STT) processing module 330 for speech-to-text conversions.

In some implementations, the speech-to-text processing module 330 receives speech input (e.g., a user utterance captured in a voice recording) through the I/O processing module 328. In some implementations, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some implementations, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some implementations, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device (e.g., voice activated device 102), sensor information collected before, during, or shortly after the user request, prior interactions (e.g., dialogue) between the digital assistant and the user, and the like.

In some implementations, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some implementations, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (i.e., the actionable intent node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, the ontology 360 shown in FIG. 3C also includes a "set reminder" node, which is another actionable intent node. Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some implementations, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

Figure 3C:
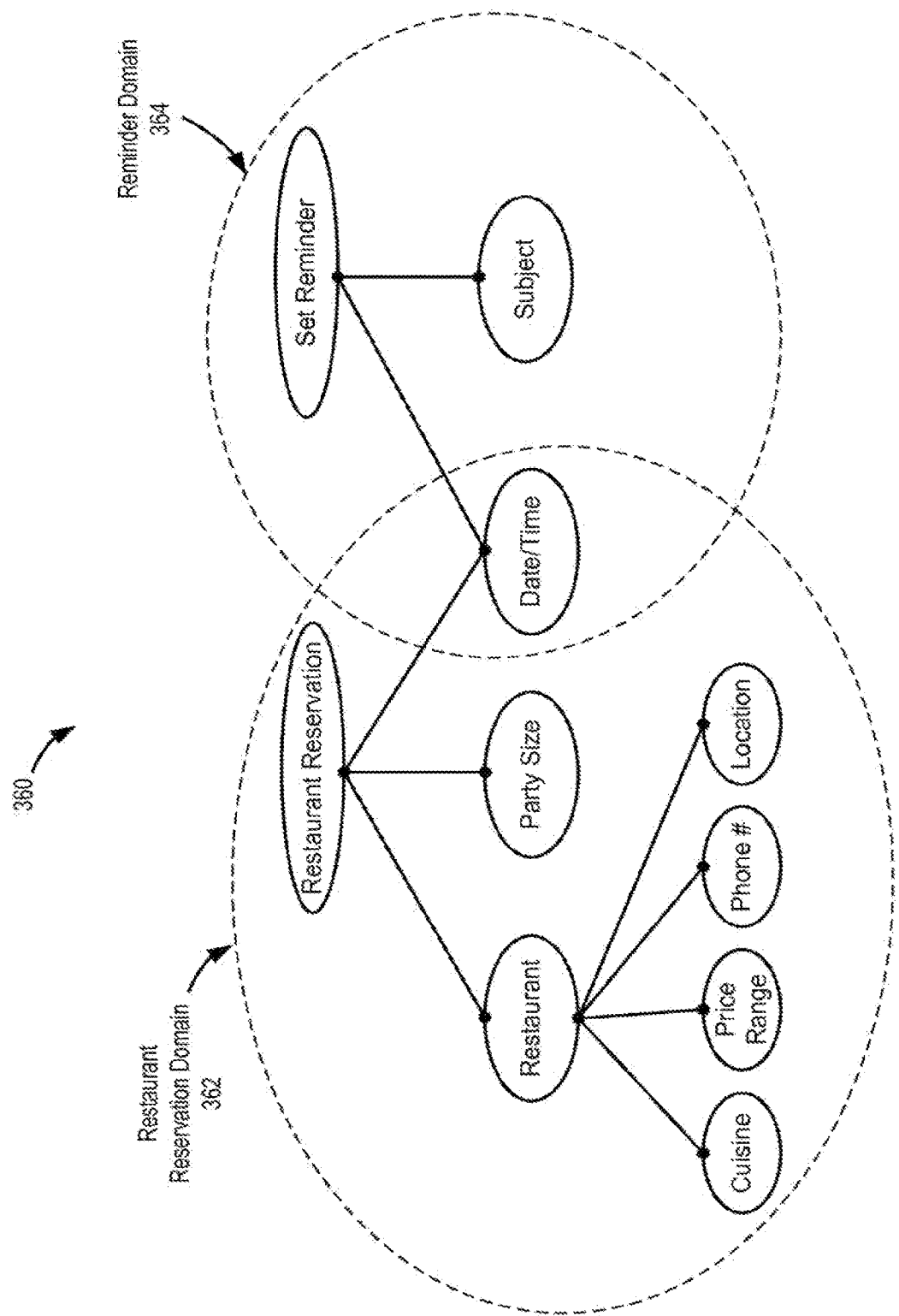
FIG. 3C is a network diagram illustrating a portion of an ontology in accordance with some implementations.

While FIG. 3C illustrates two exemplary domains within the ontology 360, the ontology 360 may include other domains (or actionable intents), such as "initiate a phone call," "find directions," "schedule a meeting," "send a message," and "provide an answer to a question," "tag a photo," and so on. For example, a "send a message" domain is associated with a "send a message" actionable intent node, and may further include property nodes such as "recipient(s)," "message type," and "message body." The property node "recipient" may be further defined, for example, by the sub-property nodes such as "recipient name" and "message address."

In some implementations, the ontology 360 includes all the domains (and hence actionable intents) that the digital assistant is capable of understanding and acting upon. In some implementations, the ontology 360 may be modified, such as by adding or removing domains or nodes, or by modifying relationships between the nodes within the ontology 360.

In some implementations, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some implementations, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some implementations, the natural language processor 332 shown in FIG. 3B receives the token sequence (e.g., a text string) from the speech-to-text processing module 330, and determines what nodes are implicated by the words in the token sequence. In some implementations, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some implementations, the domain that has the most "triggered" nodes is selected. In some implementations, the domain having the highest confidence value (e.g., based on the relative importance of its various triggered nodes) is selected. In some implementations, the domain is selected based on a combination of the number and the importance of the triggered nodes. In some implementations, additional factors are considered in selecting the node as well, such as whether the digital assistant system 300 has previously correctly interpreted a similar request from a user.

In some implementations, the digital assistant system 300 also stores names of specific entities in the vocabulary index 344, so that when one of these names is detected in the user request, the natural language processor 332 will be able to recognize that the name refers to a specific instance of a property or sub-property in the ontology. In some implementations, the names of specific entities are names of businesses, restaurants, people, movies, and the like. In some implementations, the digital assistant system 300 can search and identify specific entity names from other data sources, such as the user's address book or contact list, a movies database, a musicians database, and/or a restaurant database. In some implementations, when the natural language processor 332 identifies that a word in the token sequence is a name of a specific entity (such as a name in the user's address book or contact list), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term in or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

In some implementations, natural language processor 332 includes categorization module 349. In some implementations, the categorization module 349 determines whether each of the one or more terms in a text string (e.g., corresponding to a speech input associated with a digital photograph) is one of an entity, an activity, or a location, as discussed in greater detail below. In some implementations, the categorization module 349 classifies each term of the one or more terms as one of an entity, an activity, or a location.

Once the natural language processor 332 identifies an actionable intent (or domain) based on the user request, the natural language processor 332 generates a structured query to represent the identified actionable intent. In some implementations, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some implementations, the natural language processor 332 populates some parameters of the structured query with received context information. For example, if the user requested a sushi restaurant "near me," the natural language processor 332 may populate a {location} parameter in the structured query with GPS coordinates from the user device 104.

In some implementations, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some implementations, the various procedures necessary to complete these tasks are provided in task flow models 354. In some implementations, the task flow models 354 include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some implementations, the dialogue processing module 334 determines how (and/or when) to ask the user for the additional information, and receives and processes the user responses. In some implementations, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Continuing with the example above, when the task flow processor 336 invokes the dialogue processor 334 to determine the "party size" and "date" information for the structured query associated with the domain "restaurant reservation," the dialogue processor 334 generates questions such as "For how many people?" and "On which day?" to pass to the user. Once answers are received from the user, the dialogue processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

In some implementations, dialogue processor 334 includes disambiguation module 350. In some implementations, disambiguation module 350 disambiguates one or more ambiguous terms (e.g., one or more ambiguous terms in a text string corresponding to a speech input associated with a digital photograph). In some implementations, disambiguation module 350 identifies that a first term of the one or more terms has multiple candidate meanings, prompts a user for additional information about the first term, receives the additional information from the user in response to the prompt and identifies the entity, activity, or location associated with the first term in accordance with the additional information.

In some implementations, disambiguation module 350 disambiguates pronouns. In such implementations, disambiguation module 350 identifies one of the one or more terms as a pronoun and determines a noun to which the pronoun refers. In some implementations, disambiguation module 350 determines a noun to which the pronoun refers by using a contact list associated with a user of the voice activated device. Alternatively, or in addition, disambiguation module 350 determines a noun to which the pronoun refers as a name of an entity, an activity, or a location identified in a previous speech input associated with a previously tagged digital photograph. Alternatively, or in addition, disambiguation module 350 determines a noun to which the pronoun refers as a name of a person identified based on a previous speech input associated with a previously tagged digital photograph.

In some implementations, disambiguation module 350 accesses information obtained from one or more sensors (e.g., motion sensor 230, light sensor 234, fire sensor 236, and other sensors 232) of a user device (e.g., voice activated device 102) for determining a meaning of one or more of the terms. In some implementations, disambiguation module 350 identifies two terms each associated with one of an entity, an activity, or a location. For example, a first of the two terms refers to a person, and a second of the two terms refers to a location. In some implementations, disambiguation module 350 identifies three terms each associated with one of an entity, an activity, or a location.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar. In another example, described in greater detail below, the task flow processor 336 executes steps and instructions associated with tagging or searching for digital photographs in response to a voice input, e.g., in conjunction with photo module 132.

In some implementations, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device (e.g., voice activated device 102), and invoke or interact with third party services (e.g. a restaurant reservation portal, a social networking website or service, a banking portal, etc.). In some implementations, the protocols and application programming interfaces (API) required by each service can be specified by a respective service model among the service models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameters to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

In some implementations, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some implementations, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some implementations, the digital assistant also requests the user to indicate whether the user is satisfied with the response produced by the digital assistant 326.

Figure 4:
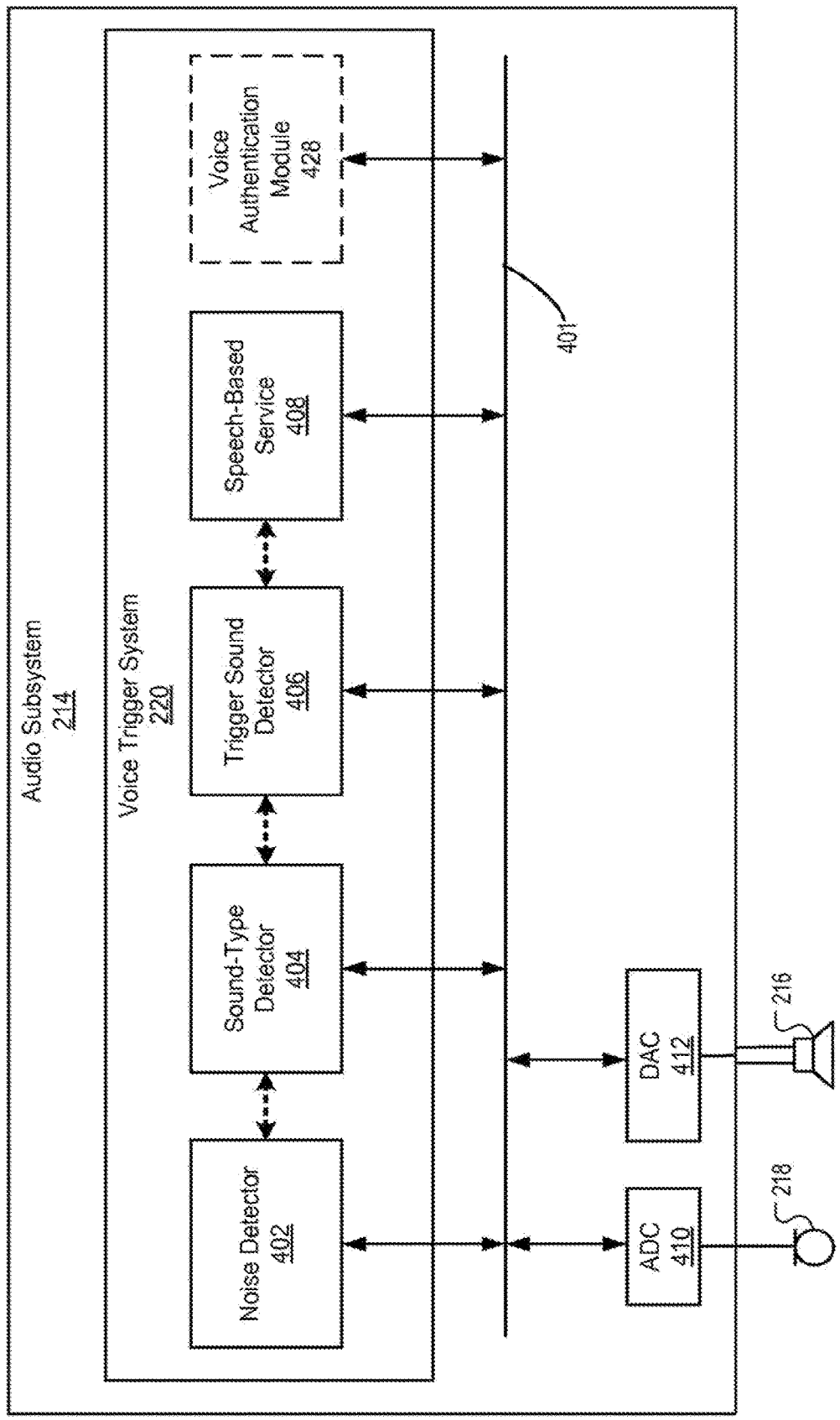
FIG. 4 is a block diagram illustrating components of an audio subsystem, in accordance with some implementations.

Attention is now directed to FIG. 4, which is a block diagram illustrating components of an audio subsystem 214, in accordance with some implementations. (The audio subsystem 214 is not limited to voice, and implementations described herein apply equally to non-voice sounds.) The audio subsystem 214 is composed of various components, modules, and/or software programs within voice activated device 102.

In some implementations, audio subsystem 214 includes analog to digital converter (ADC) 410, digital to analog converter (DAC) 412, and voice trigger system 220. In some implementations, the audio subsystem 226 is coupled to one or more microphones 218 (FIG. 2) and one or more speakers 216 (FIG. 2). The audio subsystem 214 provides sound inputs to the detectors (e.g., noise detector 402, sound-type detector 404, and trigger sound detector 406) and the speech-based service 408 (as well as other components or modules, such as wireless network module 210) for processing and/or analysis.

In some implementations, voice trigger system 220 includes a noise detector 402, a sound-type detector 404, a trigger sound detector 406, and a speech-based service 408, each coupled to an audio bus 401. In some implementations, more or fewer of these modules are used. The detectors (e.g., noise detector 402, sound-type detector 404, and trigger sound detector 406) are, optionally, referred to as modules, and optionally include hardware (e.g., circuitry, memory, processors, etc.), software (e.g., programs, software-on-a-chip, firmware, etc.), and/or any combinations thereof for performing the functionality described herein. In some implementations, the sound detectors are communicatively, programmatically, physically, and/or operationally coupled to one another (e.g., via a communications bus), as illustrated in FIG. 4 by the broken lines. For ease of illustration, FIG. 4 shows each sound detector coupled only to adjacent sound detectors. It will be understood that the each sound detector is, optionally, coupled to any of the other sound detectors as well.

In some implementations, the speech-based service 408 is a voice-based digital assistant, and corresponds to one or more components or functionalities of the digital assistant system described above with reference to FIGS. 1, 2, and 3A-3C. In some implementations, the speech-based service is a speech-to-text service, a dictation service, or the like.

In some implementations, the noise detector 402 monitors an audio channel to determine whether a sound input satisfies a predetermined condition, such as an amplitude threshold. The audio channel corresponds to a stream of audio information received by one or more sound pickup devices, such as the one or more microphones 218 (FIG. 2). The audio channel refers to the audio information regardless of its state of processing or the particular hardware that is processing and/or transmitting the audio information. For example, the audio channel may refer to analog electrical impulses (and/or the circuits on which they are propagated) from the microphone 218, as well as a digitally encoded audio stream resulting from processing of the analog electrical impulses (e.g., by ADC 410 and/or any other audio processing system of the voice activated device 102).

In some implementations, the predetermined condition is whether the sound input is above a certain volume for a predetermined amount of time. In some implementations, the noise detector uses time-domain analysis of the sound input, which requires relatively little computational and battery resources as compared to other types of analysis (e.g., as performed by the sound-type detector 404, the trigger word detector 406, and/or the speech-based service 408). In some implementations, other types of signal processing and/or audio analysis are used, including, for example, frequency-domain analysis. If the noise detector 402 determines that the sound input satisfies the predetermined condition, it initiates an upstream sound detector, such as the sound-type detector 404 (e.g., by providing a control signal to initiate one or more processing routines, and/or by providing power to the upstream sound detector). In some implementations, the upstream sound detector is initiated in response to other conditions being satisfied. For example, in some implementations, the upstream sound detector is initiated in response to determining that the voice activated device is not being stored in an enclosed space (e.g., based on a light detector detecting a threshold level of light).

The sound-type detector 404 monitors the audio channel to determine whether a sound input corresponds to a certain type of sound, such as sound that is characteristic of a human voice, whistle, clap, etc. The type of sound that the sound-type detector 404 is configured to recognize will correspond to the particular trigger sound(s) that the voice trigger is configured to recognize. In implementations where the trigger sound is a spoken word or phrase, the sound-type detector 404 includes a "voice activity detector" (VAD). In some implementations, the sound-type detector 404 uses frequency-domain analysis of the sound input. For example, the sound-type detector 404 generates a spectrogram of a received sound input (e.g., using a Fourier transform), and analyzes the spectral components of the sound input to determine whether the sound input is likely to correspond to a particular type or category of sounds (e.g., human speech). Thus, in implementations where the trigger sound is a spoken word or phrase, if the audio channel is picking up ambient sound (e.g., traffic noise) but not human speech, the voice activity detector will not initiate the trigger sound detector 406.

In some implementations, the sound-type detector 404 remains active for as long as predetermined conditions of any downstream sound detector (e.g., the noise detector 402) are satisfied. For example, in some implementations, the sound-type detector 404 remains active as long as the sound input includes sound above a predetermined amplitude threshold (as determined by the noise detector 402), and is deactivated when the sound drops below the predetermined threshold. In some implementations, once initiated, the sound-type detector 404 remains active until a condition is met, such as the expiration of a timer (e.g., for 1, 2, 5, or 10 seconds, or any other appropriate duration), the expiration of a certain number of on/off cycles of the sound-type detector 404, or the occurrence of an event (e.g., the amplitude of the sound falls below a second threshold, as determined by the noise detector 402 and/or the sound-type detector 404).

As mentioned above, if the sound-type detector 404 determines that the sound input corresponds to a predetermined type of sound, it initiates an upstream sound detector (e.g., by providing a control signal to initiate one or more processing routines, and/or by providing power to the upstream sound detector), such as the trigger sound detector 406.

The trigger sound detector 406 is configured to determine whether a sound input includes at least part of certain predetermined content (e.g., at least part of the trigger word, phrase, or sound). In some implementations, the trigger sound detector 406 compares a representation of the sound input (an "input representation") to one or more reference representations of the trigger word. If the input representation matches at least one of the one or more reference representations with an acceptable confidence, the trigger sound detector 406 initiates the speech-based service 408 (e.g., by providing a control signal to initiate one or more processing routines, and/or by providing power to the upstream sound detector). In some implementations, the input representation and the one or more reference representations are spectrograms (or mathematical representations thereof), which represent how the spectral density of a signal varies with time. In some implementations, the representations are other types of audio signatures or voiceprints. In some implementations, initiating the speech-based service 408 includes bringing one or more circuits, programs, and/or processors out of a standby mode, and invoking the sound-based service. The sound-based service is then ready to provide more comprehensive speech recognition, speech-to-text processing, and/or natural language processing.

In some implementations, the voice-trigger system 220 includes voice authentication functionality, so that it can determine if a sound input corresponds to a voice of a particular person, such as an owner/user of voice activated device 102. For example, in some implementations, the sound-type detector 404 uses a voiceprinting technique to determine that the sound input was uttered by an authorized user. Voice authentication and voiceprinting are described in more detail in U.S. patent application Ser. No. 13/053,144, which is hereby incorporated by reference in its entirety. In some implementations, voice authentication is included in any of the sound detectors described herein (e.g., the noise detector 402, the sound-type detector 404, the trigger sound detector 406, and/or the speech-based service 408). In some implementations, voice authentication is implemented as a separate module from the sound detectors listed above (e.g., as voice authentication module 428, FIG. 4), and may be operationally positioned after the noise detector 402, after the sound-type detector 404, after the trigger sound detector 406, or at any other appropriate position.

In some implementations, the trigger sound detector 406 remains active for as long as conditions of any downstream sound detector(s) (e.g., the noise detector 402 and/or the sound-type detector 404) are satisfied. For example, in some implementations, the trigger sound detector 406 remains active as long as the sound input includes sound above a predetermined threshold (as detected by the noise detector 402). In some implementations, it remains active as long as the sound input includes sound of a certain type (as detected by the sound-type detector 404). In some implementations, it remains active as long as both the foregoing conditions are met.

In some implementations, once initiated, the trigger sound detector 406 remains active until a condition is met, such as the expiration of a timer (e.g., for 1, 2, 5, or 10 seconds, or any other appropriate duration), the expiration of a certain number of on/off cycles of the trigger sound detector 406, or the occurrence of an event (e.g., the amplitude of the sound falls below a second threshold).

In some implementations, when one sound detector initiates another detector, both sound detectors remain active. However, the sound detectors may be active or inactive at various times, and it is not necessary that all of the downstream (e.g., the lower power and/or sophistication) sound detectors be active (or that their respective conditions are met) in order for upstream sound detectors to be active. For example, in some implementations, after the noise detector 402 and the sound-type detector 404 determine that their respective conditions are met, and the trigger sound detector 406 is initiated, one or both of the noise detector 402 and the sound-type detector 404 are deactivated and/or enter a standby mode while the trigger sound detector 406 operates. In other implementations, both the noise detector 402 and the sound-type detector 404 (or one or the other) stay active while the trigger sound detector 406 operates. In various implementations, different combinations of the sound detectors are active at different times, and whether one is active or inactive may depend on the state of other sound detectors, or may be independent of the state of other sound detectors.

While FIG. 4 describes three separate sound detectors, each configured to detect different aspects of a sound input, more or fewer sound detectors are used in various implementations of the voice trigger. For example, in some implementations, only the trigger sound detector 406 is used. In some implementations, the trigger sound detector 406 is used in conjunction with either the noise detector 402 or the sound-type detector 404. In some implementations, all of the detectors 402-406 are used. In some implementations, additional sound detectors are included as well.

Moreover, different combinations of sound detectors may be used at different times. For example, the particular combination of sound detectors and how they interact may depend on one or more conditions, such as the context or operating state of a voice activated device. As a specific example, if a voice activated device is plugged in (and thus not relying exclusively on battery power), the trigger sound detector 406 is active, while the noise detector 402 and the sound-type detector 404 remain inactive. In another example, if the voice activated device is in a pocket or backpack, all sound detectors are inactive.

By cascading sound detectors as described above, where the detectors that require more power are invoked only when necessary by detectors that require lower power, power efficient voice triggering functionality can be provided. As described above, additional power efficiency is achieved by operating one or more of the sound detectors according to a duty cycle. For example, in some implementations, the noise detector 402 operates according to a duty cycle so that it performs effectively continuous noise detection, even though the noise detector is off for at least part of the time. In some implementations, the noise detector 402 is on for 10 milliseconds and off for 90 milliseconds. In some implementations, the noise detector 402 is on for 20 milliseconds and off for 500 milliseconds. Other on and off durations are also possible.

In some implementations, if the noise detector 402 detects a noise during its "on" interval, the noise detector 402 will remain on in order to further process and/or analyze the sound input. For example, the noise detector 402 may be configured to initiate an upstream sound detector if it detects sound above a predetermined amplitude for a predetermined amount of time (e.g., 100 milliseconds). Thus, if the noise detector 402 detects sound above a predetermined amplitude during its 10 millisecond "on" interval, it will not immediately enter the "off" interval. Instead, the noise detector 402 remains active and continues to process the sound input to determine whether it exceeds the threshold for the full predetermined duration (e.g., 100 milliseconds).

In some implementations, the sound-type detector 404 operates according to a duty cycle. In some implementations, the sound-type detector 404 is on for 20 milliseconds and off for 100 milliseconds. Other on and off durations are also possible. In some implementations, the sound-type detector 404 is able to determine whether a sound input corresponds to a predetermined type of sound within the "on" interval of its duty cycle. Thus, the sound-type detector 404 will initiate the trigger sound detector 406 (or any other upstream sound detector) if the sound-type detector 404 determines, during its "on" interval, that the sound is of a certain type. Alternatively, in some implementations, if the sound-type detector 404 detects, during the "on" interval, sound that may correspond to the predetermined type, the detector will not immediately enter the "off" interval. Instead, the sound-type detector 404 remains active and continues to process the sound input and determine whether it corresponds to the predetermined type of sound. In some implementations, if the sound detector determines that the predetermined type of sound has been detected, it initiates the trigger sound detector 406 to further process the sound input and determine if the trigger sound has been detected.

Similar to the noise detector 402 and the sound-type detector 404, in some implementations, the trigger sound detector 406 operates according to a duty cycle. In some implementations, the trigger sound detector 406 is on for 50 milliseconds and off for 50 milliseconds. Other on and off durations are also possible. If the trigger sound detector 406 detects, during its "on" interval, that there is sound that may correspond to a trigger sound, the detector will not immediately enter the "off" interval. Instead, the trigger sound detector 406 remains active and continues to process the sound input and determine whether it includes the trigger sound. In some implementations, if such a sound is detected, the trigger sound detector 406 remains active to process the audio for a predetermined duration, such as 1, 2, 5, or 10 seconds, or any other appropriate duration. In some implementations, the duration is selected based on the length of the particular trigger word or sound that it is configured to detect. For example, if the trigger phrase is "Hey, Assistant," the trigger word detector is operated for about 2 seconds to determine whether the sound input includes that phrase.

In some implementations, some of the sound detectors are operated according to a duty cycle, while others operate continuously when active. For example, in some implementations, only the first sound detector is operated according to a duty cycle (e.g., the noise detector 402 in FIG. 4), and upstream sound detectors are operated continuously once they are initiated. In some other implementations, the noise detector 402 and the sound-type detector 404 are operated according to a duty cycle, while the trigger sound detector 406 is operated continuously. Whether a particular sound detector is operated continuously or according to a duty cycle depends on one or more conditions, such as the context or operating state of a voice activated device. In some implementations, if a voice activated device is plugged in and not relying exclusively on battery power, all of the sound detectors operate continuously once they are initiated. In other implementations, the noise detector 402 (or any of the sound detectors) operates according to a duty cycle if the voice activated device is in a pocket or backpack (e.g., as determined by sensor and/or microphone signals), but operates continuously when it is determined that the voice activated device is likely not being stored. In some implementations, whether a particular sound detector is operated continuously or according to a duty cycle depends on the battery charge level of the voice activated device. For example, the noise detector 402 operates continuously when the battery charge is above 50%, and operates according to a duty cycle when the battery charge is below 50%.

In some implementations, the voice trigger includes noise, echo, and/or sound cancellation functionality (referred to collectively as noise cancellation). In some implementations, noise cancellation is performed by audio subsystem 214 (e.g., by an audio DSP). Noise cancellation reduces or removes unwanted noise or sounds from the sound input prior to it being processed by the sound detectors. In some cases, the unwanted noise is background noise from the user's environment, such as a fan or the clicking from a keyboard. In some implementations, the unwanted noise is any sound above, below, or at predetermined amplitudes or frequencies. For example, in some implementations, sound above the typical human vocal range (e.g., 3,000 Hz) is filtered out or removed from the signal. In some implementations, multiple microphones (e.g., the microphones 218) are used to help determine what components of received sound should be reduced and/or removed. For example, in some implementations, the audio subsystem 214 uses beam forming techniques to identify sounds or portions of sound inputs that appear to originate from a single point in space (e.g., a user's mouth). The audio subsystem 214 then focuses on this sound by removing from the sound input sounds that are received equally by all microphones (e.g., ambient sound that does not appear to originate from any particular direction).

In some implementations, the DSP is configured to cancel or remove from the sound input sounds that are being output by the voice activated device on which the digital assistant is operating. For example, if the audio subsystem 214 is outputting music, radio, a podcast, a voice output, or any other audio content (e.g., via the speaker 216), the DSP removes any of the outputted sound that was picked up by a microphone and included in the sound input. Thus, the sound input is free of the outputted audio (or at least contains less of the outputted audio). Accordingly, the sound input that is provided to the sound detectors will be cleaner, and the triggers more accurate. Aspects of noise cancellation are described in more detail in U.S. Pat. No. 7,272,224, which is hereby incorporated by reference in its entirety.

In some implementations, different sound detectors require that the sound input be filtered and/or preprocessed in different ways. For example, in some implementations, the noise detector 402 is configured to analyze time-domain audio signal between 60 and 20,000 Hz, and the sound-type detector is configured to perform frequency-domain analysis of audio between 60 and 3,000 Hz. Thus, in some implementations, an audio DSP of device 102 preprocesses received audio according to the respective needs of the sound detectors. In some implementations, on the other hand, the sound detectors are configured to filter and/or preprocess the audio from the audio subsystem 214 according to their specific needs. In such cases, the audio DSP may still perform noise cancellation prior to providing the sound input to the sound detectors.

In some implementations, the context of the voice activated device is used to help determine whether and how to operate the voice trigger. For example, it may be unlikely that users will invoke a speech-based service, such as a voice-based digital assistant, when the voice activated device is stored in their pocket, purse, or backpack. Also, it may be unlikely that users will invoke a speech-based service when they are listening to a loud rock concert. For some users, it is unlikely that they will invoke a speech-based service at certain times of the day (e.g., late at night). On the other hand, there are also contexts in which it is more likely that a user will invoke a speech-based service using a voice trigger. For example, some users will be more likely to use a voice trigger when they are alone, when they are at home, or the like. Various techniques are used to determine the context of a voice activated device. In various implementations, the voice activated device uses information from any one or more of the following components or information sources to determine the context of a voice activated device: light sensors, microphones, proximity sensors, motion sensors, cameras, communications circuitry and/or antennas, charging and/or power circuitry, temperature sensors, calendars, user preferences, etc.

The context of the voice activated device can then be used to adjust how and whether the voice trigger operates. For example, in certain contexts, the voice trigger will be deactivated (or operated in a different mode) as long as that context is maintained. For example, in some implementations, the voice trigger is deactivated when the voice activated device is unplugged, during predetermined time periods (e.g., between 10:00 PM and 8:00 AM), when the voice activated device is in a substantially enclosed space (e.g., a pocket, bag, purse, drawer, or glove box), when the voice activated device is near other devices that have a voice trigger and/or speech-based services (e.g., based on acoustic/wireless/infrared communications), and the like. In some implementations, instead of being deactivated, the voice trigger system 220 is operated in a low-power mode (e.g., by operating the noise detector 402 according to a duty cycle with a 10 millisecond "on" interval and a 5 second "off" interval). In some implementations, an audio channel is monitored more infrequently when the voice trigger system 220 is operated in a low-power mode. In some implementations, a voice trigger uses a different sound detector or combination of sound detectors when it is in a low-power mode than when it is in a normal mode. (The voice trigger may be capable of numerous different modes or operating states, each of which may use a different amount of power, and different implementations will use them according to their specific designs.)

On the other hand, when the voice activated device is in some other contexts, the voice trigger will be activated (or operated in a different mode) so long as that context is maintained. For example, in some implementations, the voice trigger remains active while it is plugged into a power source, during predetermined time periods (e.g., between 8:00 AM and 10:00 PM), when the voice activated device is travelling in a vehicle (e.g., based on GPS signals, BLUETOOTH connection or coupling with a vehicle, etc.), and the like. Aspects of determining when a device is in a vehicle are described in more detail in U.S. Provisional Patent Application No. 61/657,744, which is hereby incorporated by reference in its entirety. Several specific examples of how to determine certain contexts are provided below. In various embodiments, different techniques and/or information sources are used to detect these and other contexts.

As noted above, whether or not the voice trigger system 220 is active (e.g., listening) can depend on the physical orientation of a voice activated device. This provides a user with an easy way to activate and/or deactivate the voice trigger without requiring manipulation of switches or buttons. In some implementations, the voice activated device detects whether it is face-up or face-down on a surface using light sensors (e.g., based on the difference in incident light on a front and a back face of device 102), proximity sensors, cameras, and the like.

In some implementations, other operating modes, settings, parameters, or preferences are affected by the orientation and/or position of the voice activated device. In some implementations, the particular trigger sound, word, or phrase of the voice trigger is listening for depends on the orientation and/or position of the voice activated device. For example, in some implementations, the voice trigger listens for a first trigger word, phrase, or sound when the voice activated device is in one orientation (e.g., laying face-up on a surface), and a different trigger word, phrase, or sound when the voice activated device is in another orientation (e.g., laying face-down). In some implementations, the trigger phrase for a face-down orientation is longer and/or more complex than for a face-up orientation. Thus, a user can place a voice activated device face-down when they are around other people or in a noisy environment so that the voice trigger can still be operational while also reducing false accepts, which may be more frequent for shorter or simpler trigger words. As a specific example, a face-up trigger phrase may be "Hey, Assistant," while a face-down trigger phrase may be "Hey, Assistant, this is Andrew, please wake up." The longer trigger phrase also provides a larger voice sample for the sound detectors and/or voice authenticators to process and/or analyze, thus increasing the accuracy of the voice trigger and decreasing false accepts.

In some implementations, the voice activated device detects whether the voice activated device is stored (e.g., in a pocket, purse, bag, a drawer, or the like) by determining whether it is in a substantially enclosed space. In some implementations, the voice activated device uses light sensors (e.g., dedicated ambient light sensors and/or cameras) to determine that it is stored. For example, in some implementations, the voice activated device is likely being stored if light sensors detect little or no light. In some implementations, the time of day and/or location of the voice activated device are also considered. For example, if the light sensors detect low light levels when high light levels would be expected (e.g., during the day), the voice activated device may be in storage and the voice trigger system 220 not needed. Thus, the voice trigger system 220 will be placed in a low-power or standby state.

In some implementations, the difference in light detected by sensors located on opposite faces of a voice activated device can be used to determine its position, and hence whether or not it is stored. Specifically, users are likely to attempt to activate a voice trigger when the voice activated device is resting on a table or surface rather than when it is being stored in a pocket or bag. But when a voice activated device is lying face-down (or face-up) on a surface such as a table or desk, one surface of the voice activated device will be occluded so that little or no light reaches that surface, while the other surface will be exposed to ambient light.

Thus, if light sensors on the front and back face of a voice activated device detect significantly different light levels, the voice activated device determines that it is not being stored. On the other hand, if light sensors on opposite faces detect the same or similar light levels, the voice activated device determines that it is being stored in a substantially enclosed space. Also, if the light sensors both detect a low light level during the daytime (or when the voice activated device would expect the phone to be in a bright environment), the voice activated device determines with a greater confidence that it is being stored.

In some implementations, other techniques are used (instead of or in addition to light sensors) to determine whether the voice activated device is stored. For example, in some implementations, the voice activated device emits one or more sounds (e.g., tones, clicks, pings, etc.) from a speaker or transducer (e.g., speaker 216), and monitors one or more microphones or transducers (e.g., microphone 218) to detect echoes of the omitted sound(s). (In some implementations, the voice activated device emits inaudible signals, such as sound outside of the human hearing range.) From the echoes, the voice activated device determines characteristics of the surrounding environment. For example, a relatively large environment (e.g., a room or a vehicle) will reflect the sound differently than a relatively small, enclosed environment (e.g., a pocket, purse, bag, a drawer, or the like).

In some implementations, the voice trigger system 220 operates differently if it is near other devices (such as other devices that have voice triggers and/or speech-based services) than if it is not near other devices. This may be useful, for example, to shut down or decrease the sensitivity of the voice trigger system 220 when many devices are close together so that if one person utters a trigger word, other surrounding devices are not triggered as well. In some implementations, a voice activated device determines proximity to other devices using RFID, near-field communications, infrared/acoustic signals, or the like.

Because people's voices vary greatly, it may be necessary or beneficial to tune a voice trigger to improve its accuracy in recognizing the voice of a particular user. Also, people's voices may change over time, for example, because of illnesses, natural voice changes relating to aging or hormonal changes, and the like. Thus, in some implementations, the voice trigger system 220 is able to adapt its voice and/or sound recognition profiles for a particular user or group of users.

As described above, sound detectors (e.g., the sound-type detector 404 and/or the trigger sound detector 406) may be configured to compare a representation of a sound input (e.g., the sound or utterance provided by a user) to one or more reference representations. For example, if an input representation matches the reference representation to a predetermined confidence level, the sound detector will determine that the sound input corresponds to a predetermined type of sound (e.g., the sound-type detector 404), or that the sound input includes predetermined content (e.g., the trigger sound detector 406). In order to tune the voice trigger system 220, in some implementations, the voice activated device adjusts the reference representation to which the input representation is compared. In some implementations, the reference representation is adjusted (or created) as part of a voice enrollment or "training" procedure, where a user outputs the trigger sound several times so that the voice activated device can adjust (or create) the reference representation. The voice activated device can then create a reference representation using that person's actual voice.

In some implementations, the voice activated device uses trigger sounds that are received under normal use conditions to adjust the reference representation. For example, after a successful voice triggering event (e.g., where the sound input was found to satisfy all of the triggering criteria) the voice activated device will use information from the sound input to adjust and/or tune the reference representation. In some implementations, only sound inputs that were determined to satisfy all or some of the triggering criteria with a certain confidence level are used to adjust the reference representation. Thus, when the voice trigger is less confident that a sound input corresponds to or includes a trigger sound, that voice input may be ignored for the purposes of adjusting the reference representation. On the other hand, in some implementations, sound inputs that satisfied the voice trigger system 220 to a lower confidence are used to adjust the reference representation.

In some implementations, device 102 iteratively adjusts the reference representation (using these or other techniques) as more and more sound inputs are received so that slight changes in a user's voice over time can be accommodated. For example, in some implementations, device 102 (and/or associated devices or services) adjusts the reference representation after each successful triggering event. In some implementations, device 102 analyzes the sound input associated with each successful triggering event and determines if the reference representations should be adjusted based on that input (e.g., if certain conditions are met), and only adjusts the reference representation if it is appropriate to do so. In some implementations, device 102 maintains a moving average of the reference representation over time.

In some implementations, the voice trigger system 220 detects sounds that do not satisfy one or more of the triggering criteria (e.g., as determined by one or more of the sound detectors), but that may actually be attempts by an authorized user to do so. For example, voice trigger system 220 may be configured to respond to a trigger phrase such as "Hey, Assistant," but if a user's voice has changed (e.g., due to sickness, age, accent/inflection changes, etc.), the voice trigger system 220 may not recognize the user's attempt to activate the voice activated device. (This may also occur when the voice trigger system 220 has not been properly tuned for that user's particular voice, such as when the voice trigger system 220 is set to default conditions and/or the user has not performed an initialization or training procedure to customize the voice trigger system 220 for his or her voice.) If the voice trigger system 220 does not respond to the user's first attempt to active the voice trigger, the user is likely to repeat the trigger phrase. The voice activated device detects that these repeated sound inputs are similar to one another, and/or that they are similar to the trigger phrase (though not similar enough to cause the voice trigger system 220 to activate the speech-based service). If such conditions are met, the voice activated device determines that the sound inputs correspond to valid attempts to activate the voice trigger system 220. Accordingly, in some implementations, the voice trigger system 220 uses those received sound inputs to adjust one or more aspects of the voice trigger system 220 so that similar utterances by the user will be accepted as valid triggers in the future. In some implementations, these sound inputs are used to adapt the voice trigger system 220 only if a certain conditions or combinations of conditions are met. For example, in some implementations, the sound inputs are used to adapt the voice trigger system 220 when a predetermined number of sound inputs are received in succession (e.g., 2, 3, 4, 5, or any other appropriate number), when the sound inputs are sufficiently similar to the reference representation, when the sound inputs are sufficiently similar to each other, when the sound inputs are close together (e.g., when they are received within a predetermined time period and/or at or near a predetermined interval), and/or any combination of these or other conditions.

While the adaptation techniques described above refer to adjusting a reference representation, other aspects of the trigger sound detecting techniques may be adjusted in the same or similar manner in addition to or instead of adjusting the reference representation. For example, in some implementations, the voice activated device adjusts how sound inputs are filtered and/or what filters are applied to sound inputs, such as to focus on and/or eliminate certain frequencies or ranges of frequencies of a sound input. In some implementations, the voice activated device adjusts an algorithm that is used to compare the input representation with the reference representation. For example, in some implementations, one or more terms of a mathematical function used to determine the difference between an input representation and a reference representation are changed, added, or removed, or a different mathematical function is substituted.

Figure 5:
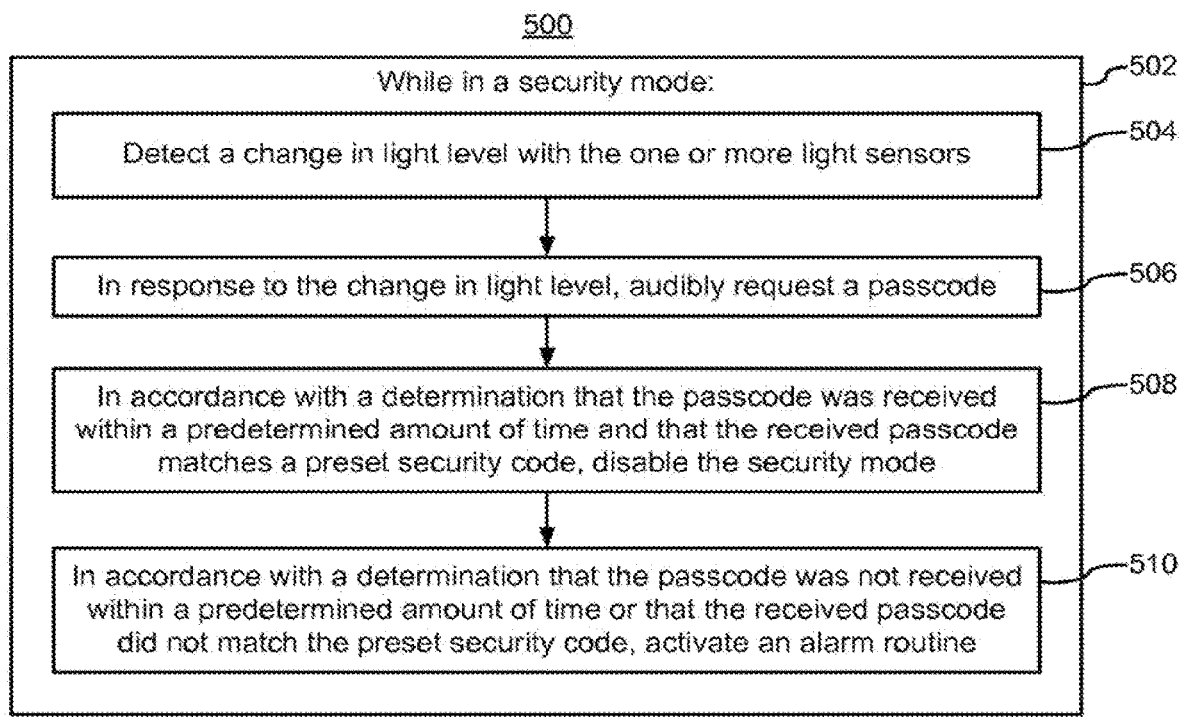
FIGS. 5-6 are flow charts illustrating methods for a voice activated device operating in a security mode, in accordance with some implementations.
Figure 6:
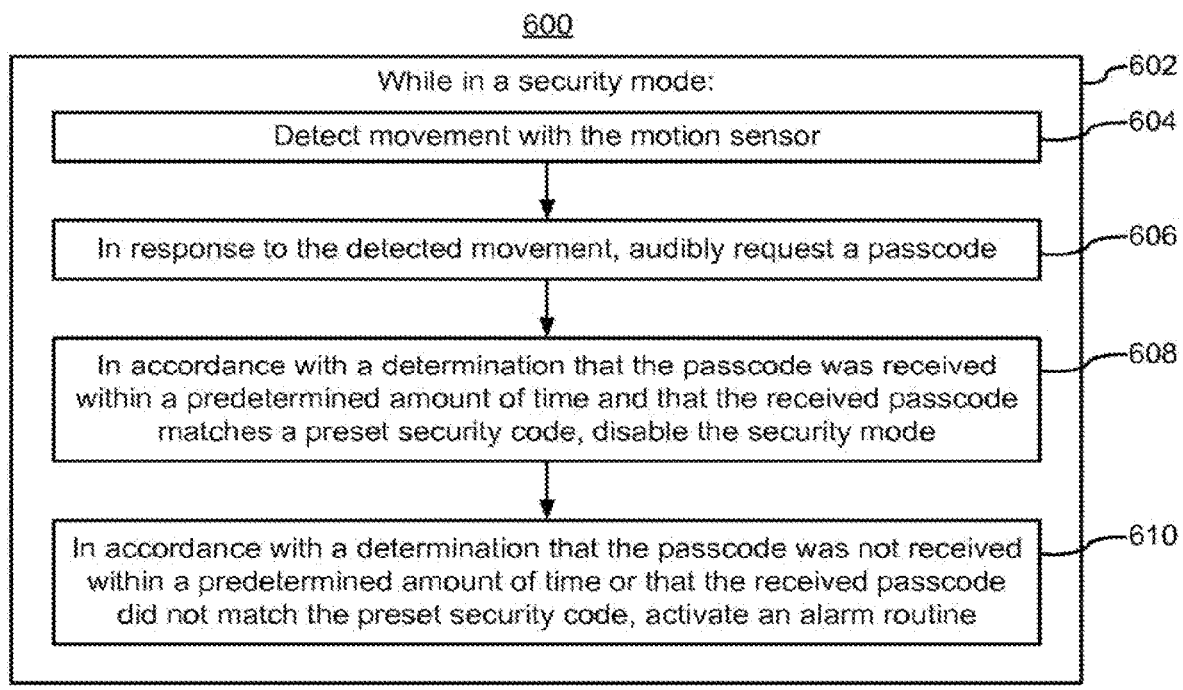

In some implementations, adaptation techniques such as those described above require more resources than the voice trigger system 220 is able to or is configured to provide. In particular, the sound detectors may not have, or have access to, the amount or the types of processors, data, or memory that are necessary to perform the iterative adaptation of a reference representation and/or a sound detection algorithm (or any other appropriate aspect of the voice trigger system 220). Thus, in some implementations, one or more of the above described adaptation techniques are performed by a more powerful processor, such as an application processor (e.g., the processor(s) 204), or by a different device (e.g., the server system 108). However, the voice trigger system 220 is designed to operate even when the application processor is in a standby mode. Thus, the sound inputs which are to be used to adapt the voice trigger system 220 are received when the application processor is not active and cannot process the sound input. Accordingly, in some implementations, the sound input is stored by the voice activated device so that it can be further processed and/or analyzed after it is received. In some implementations, the sound input is stored in system memory (e.g., memory 206, FIG. 2) using direct memory access (DMA) techniques (including, for example, using a DMA engine so that data can be copied or moved without requiring the application processor to be initiated). The stored sound input is then provided to or accessed by the application processor (or the server system 108, or another appropriate device) once it is initiated so that the application processor can execute one or more of the adaptation techniques described above. In some implementations, FIGS. 5-6 are flow diagrams representing methods for operating a voice activated device in a security mode, according to certain implementations. The methods are, optionally, governed by instructions that are stored in a computer memory or non-transitory computer readable storage medium (e.g., memory 206 of device 102, memory 302 associated with the digital assistant system 300) and that are executed by one or more processors of one or more computer systems of a digital assistant system, including, but not limited to, server system 108, and/or voice activated device 102. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations in each method may be combined and/or the order of some operations may be changed from the order shown in the figures. Also, in some implementations, operations shown in separate figures and/or discussed in association with separate methods may be combined to form other methods, and operations shown in the same figure and/or discussed in association with the same method may be separated into different methods. Moreover, in some implementations, one or more operations in the methods are performed by modules of the digital assistant system 300 and/or an electronic device (e.g., the voice activated device 102), including, for example, the natural language processing module 332, the dialogue flow processing module 334, the audio subsystem 214, the noise detector 402, the sound-type detector 404, the trigger sound detector 406, the speech-based service 408, and/or any sub modules thereof.

FIG. 5 illustrates a method 500 of operating a voice activated device (e.g., voice activated device 102, FIG. 2) in a security mode, according to some implementations. While in a security mode (502), the voice activated device detects (504) a change in light level with the one or more light sensors. In some embodiments, detecting the change in the light level includes detecting an increase in light level (e.g., with light sensor 234) above a predefined threshold. In some embodiments, detecting the change in the light level includes detecting a decrease in light level (e.g., with light sensor 234) below a predefined threshold.

In response to the change in light level, the voice activated device audibly requests (506) a passcode. For example, the voice activated device prompts the user (e.g., using speaker 216) to speak a preset password which will be captured by microphone 218.

In accordance with a determination that the passcode was received within a predetermined amount of time (e.g., 0.5, 1, 5, 10, 20 seconds or another reasonable time period) and that the received passcode matches a preset security code, the voice activated device disables (508) the security mode. For example, the user speaks the passcode within a predetermined amount of time and the voice activated device verifies the passcode then enters a default or preset mode.

In accordance with a determination that the passcode was not received within a predetermined amount of time or that the received passcode did not match the preset security code, the voice activated device activates (510) an alarm routine. In some implementations, activating the alarm routine includes notifying the police that an intruder is preset. In some implementations, activating the alarm routine includes playing an audile alarm. In some implementations, activating the alarm routine includes sending an alert notification to coupled devices. In some implementations, activating the alarm routine includes locking all coupled devices.

FIG. 6 illustrates a method 600 of operating a voice activated device (e.g., voice activated device 102, FIG. 2) in a security mode, according to some implementations. While in a security mode (602), the voice activated device detects (604) movement with the motion sensor. For example, the voice activated device detects a person entering the room.

In response to the detected movement, the voice activated device audibly requests (606) a passcode. In accordance with a determination that the passcode was received within a predetermined amount of time (e.g., 0.5, 1, 5, 10, 20 seconds or another reasonable time period) and that the received passcode matches a preset security code, the voice activated device disables (608) the security mode. In accordance with a determination that the passcode was not received within a predetermined amount of time or that the received passcode did not match the preset security code, the voice activated device activates 610) an alarm routine. In some implementations, activating the alarm routine includes notifying the police that an intruder is preset. In some implementations, activating the alarm routine includes playing an audile alarm. In some implementations, activating the alarm routine includes sending an alert notification to coupled devices. In some implementations, the voice activated device is coupled to a plurality of user devices and activating the alarm routine includes locking at least a subset of the coupled devices.

The foregoing description, for purpose of explanation, has been described with reference to specific implementations. However, the illustrative discussions above are not intended to be exhaustive or to limit the disclosed implementations to the precise forms disclosed. Many modifications and variations are possible in view of the above teachings. The implementations were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one clement from another. For example, a first sound detector could be termed a second sound detector, and, similarly, a second sound detector could be termed a first sound detector, without changing the meaning of the description, so long as all occurrences of the "first sound detector" are renamed consistently and all occurrences of the "second sound detector" are renamed consistently. The first sound detector and the second sound detector are both sound detectors, but they are not the same sound detector.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A voice activated device for use with home automation of controllable devices, the voice activated device comprising:
    a microphone capable of receiving audio;
    a processor coupled to the microphone; and
    memory coupled to the processor and comprising computer-executable instructions for:
        detecting in the received audio a portion of a trigger phrase spoken by a user;
        in accordance with the detection of the portion of the trigger phrase, causing subsequent user speech to be digitally recorded, the subsequent user speech being included in the received audio with the trigger phrase;
        causing speech recognition to be performed to identify a user request from the recorded user speech, wherein identifying the user request comprises:
            generating text based on the recorded user speech,
            performing natural language processing of the text, and
            determining user intent based on a result of the natural language processing; and
        in response to identifying the user request, causing a command to be transmitted to a controllable device.

2. The voice activated device of claim 1, wherein the controllable device comprises a network-connected light switch.

3. The voice activated device of claim 1, wherein the command comprises a room temperature setting; and
    wherein the controllable device comprises a network-connected thermostat.

4. The voice activated device of claim 1, further comprising:
    a noise detector capable of determining whether a sound input satisfies a predetermined condition and causing the microphone to turn on in response to the sound input satisfying the predetermined condition;
    wherein the predetermined condition comprises a volume of the sound input.

5. The voice activated device of claim 1, further comprising:
    a sound-type detector capable of determining whether a sound input corresponds to a sound having a frequency associated with human speech and further capable of causing the microphone to turn on in response to the sound input corresponding to the sound having a frequency associated with human speech.

6. The voice activated device of claim 1, wherein the user request comprises a trigger word associated with a macro.

7. The voice activated device of claim 6, wherein causing the command to be transmitted to the controllable device comprises causing the macro associated with the trigger word to be executed.

8. The voice activated device of claim 7, wherein causing the macro associated with the trigger word to be executed comprises:
    causing a first instruction to be transmitted to a first network-connected device; and
    causing a second instruction to be transmitted to a second network-connected device.

9. A voice activated device comprising:
    a first sound detector; and
    a second sound detector coupled to the first sound detector;
    wherein the first sound detector is capable of causing the second sound detector to be turned on in response to detecting a first trigger sound, wherein the second sound detector changes its power mode after it is turned on; and wherein the second sound detector is capable of causing received audio to be analyzed with a speech recognition process in response to detecting a second trigger sound.

10. The voice activated device of claim 9, wherein the first sound detector comprises a noise detector; and
wherein the first trigger sound comprises a sound at or above a predetermined volume.

11. The voice activated device of claim 9, wherein the first sound detector comprises a sound-type detector; and
wherein the first trigger sound comprises a sound having a frequency associated with human speech.

12. The voice activated device of claim 9, wherein the second trigger sound comprises a portion of a trigger phrase spoken by a user.

13. The voice activated device of claim 9, further comprising:
a microphone;
wherein the second sound detector is capable of causing the received audio to be recorded from the microphone in response to detecting the second trigger sound.

14. The voice activated device of claim 13, wherein the first trigger sound comprises a sound at or above a predetermined volume; and
wherein the second trigger sound comprises a sound having a frequency associated with human speech.

15. The voice activated device of claim 9, further comprising:
a processor; and
memory coupled to the processor and comprising computer-executable instructions for:
causing speech recognition to be performed on the received audio to identify a user request.

16. The voice activated device of claim 15, the memory further comprising computer-executable instructions for:
in response to identifying the user request, causing textual news information to be obtained from an internet source, causing the textual news information to be converted to audio signals, and causing the audio signals to be output via a speaker of the voice activated device.

17. The voice activated device of claim 15, the memory further comprising computer-executable instructions for:
in response to identifying the user request, causing a command to be transmitted to a network-connected controllable device.

18. The voice activated device of claim 15, wherein the user request comprises a trigger word associated with a macro; and
wherein the memory further comprises computer-executable instructions for:
in response to identifying the user request, causing the macro to be executed.

19. A voice activated device for causing a macro to be executed, the voice activated device comprising:
a microphone capable of receiving audio;
a processor coupled to the microphone; and
memory coupled to the processor and comprising computer-executable instructions for:
detecting in the received audio a portion of a trigger phrase spoken by a user;
in accordance with the detection of the portion of the trigger phrase, causing subsequent user speech to be digitally recorded, the subsequent user speech being included in the received audio with the trigger phrase;
causing speech recognition to be performed to identify a user request from the digitally recorded user speech, wherein the user request comprises a trigger word associated with a macro, wherein identifying the user request comprises:
generating text based on the recorded user speech, performing natural language processing of the text, and
determining user intent based on a result of the natural language processing; and
in response to identifying the user request, causing the macro to be executed.

20. The voice activated device of claim 19, the memory further comprising computer-executable instructions for:
receiving audio comprising the trigger word;
receiving two or more commands for controlling one or more network-connected controllable devices;
generating the macro comprising the two or more commands; and
associating the trigger word with the macro in a database.

21. The voice activated device of claim 20, wherein causing the macro to be executed comprises:
causing the two or more commands to be transmitted to the one or more network-connected controllable devices.

22. The voice activated device of claim 19, wherein causing the macro to be executed comprises:
causing a first instruction to be transmitted to a first network-connected device; and
causing a second instruction to be transmitted to a second network-connected device.

23. The voice activated device of claim 19, wherein causing the macro to be executed comprises two or more of:
causing a signal to be transmitted to a controllable device;
causing textual information to be converted to audio signals that are output via a speaker of the voice activated device;
causing textual news information to be obtained from an Internet source; and
causing audio to be output via the speaker of the voice activated device.

24. A voice activated device comprising:
a housing;
one or more processors in the housing;
a wireless network module at least partially within the housing, the wireless network module coupled to the one or more processors;
a human-machine interface comprising:
at least one speaker at least partially within the housing;
at least one microphone at least partially within the housing;
an analog to digital converter coupled to the microphone and configured to convert speech into digital signals; and
a digital to analog converter coupled to the at least one speaker and configured to convert received data into audio signals, including speech; and
memory in the housing, the memory coupled to the one or more processors and comprising instructions for:
detecting, in the digital signals of the converted speech, a portion of a trigger phrase spoken by a user;
in accordance with the detection of the portion of the trigger phrase, causing speech recognition to be performed to identify a user request from the digital signals of the converted speech, the converted speech corresponding to a speech including the user request and the portion of the trigger phrase spoken by the user, wherein identifying the user request comprises:
generating text based on the recorded user speech,
performing natural language processing of the text, and
determining user intent based on a result of the natural language processing;
in response to identifying the user request, causing news information to be obtained from an Internet source; and
causing the obtained news information to be converted into audio signals and played via the at least one speaker.

25. The voice activated device of claim 24, wherein the user request comprises a request for stock market data; and
wherein the news information comprises stock market data.

26. The voice activated device of claim 24, wherein the user request comprises a request for weather data; and
wherein the news information comprises weather data.

27. The voice activated device of claim 24, wherein the user request comprises a request for headline news; and
wherein the news information comprises headline news.

28. The voice activated device of claim 24, wherein the device is configured to store a personalized configuration for each of a plurality of users and, when activated by a respective user, to utilize the respective personalized configuration.

29. The voice activated device of claim 24, wherein the device is configured to access a calendar associated with the user, cause modifications to the calendar, and provide calendar reminders to the user.

30. The voice activated device of claim 24, wherein the device is configured to store in a database one or more macros provided by the user, wherein each macro is associated with a respective phrase; and
wherein the device is further configured to cause the macro associated with the respective phrase to be executed when the respective phrase is spoken by the user.

31. A voice activated device for use with home automation of controllable devices, the voice activated device comprising:
a microphone capable of receiving audio;
a processor coupled to the microphone; and
memory coupled to the processor and comprising computer-executable instructions for:
detecting in the received audio a portion of a trigger phrase spoken by a user;
in response to detecting the portion of the trigger phrase, causing subsequent user speech to be digitally recorded, the subsequent user speech being included in the received audio with the trigger phrase;
causing speech recognition to be performed to identify a user request from the recorded user speech, wherein identifying the user request comprises:
generating text based on the recorded user speech,
performing natural language processing of the text, and
determining user intent based on a result of the natural language processing; and
in response to identifying the user request, causing a command to be executed on the voice activated device.

* * * * *